(12) United States Patent
Burger

(10) Patent No.: US 10,719,321 B2
(45) Date of Patent: Jul. 21, 2020

(54) PREFETCHING INSTRUCTION BLOCKS

(71) Applicant: Microsoft Technology Licensing, LLC, Redmond, WA (US)

(72) Inventor: Douglas C. Burger, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 300 days.

(21) Appl. No.: 15/043,362

(22) Filed: Feb. 12, 2016

(65) Prior Publication Data
US 2017/0083337 A1 Mar. 23, 2017

Related U.S. Application Data

(60) Provisional application No. 62/221,003, filed on Sep. 19, 2015.

(51) Int. Cl.
*G06F 9/30* (2018.01)
*G06F 9/38* (2018.01)
(Continued)

(52) U.S. Cl.
CPC .......... *G06F 9/3016* (2013.01); *G06F 9/268* (2013.01); *G06F 9/3004* (2013.01);
(Continued)

(58) Field of Classification Search
None
See application file for complete search history.

(56) References Cited

U.S. PATENT DOCUMENTS 5,136,697 A  8/1992 Johnson
5,317,734 A  5/1994 Gupta
(Continued)

FOREIGN PATENT DOCUMENTS

EP  2320318  5/2011
JP  2001175473 A  6/2001
(Continued)

OTHER PUBLICATIONS

International Search Report and Written Opinion issued in PCT Application No. PCT/US2016/051420, dated Dec. 16, 2016, 10 pages.
(Continued)

*Primary Examiner* — Corey S Faherty
(74) *Attorney, Agent, or Firm* — Klarquist Sparkman, LLP

(57) ABSTRACT

Technology related to prefetching instruction blocks is disclosed. In one example of the disclosed technology, a processor comprises a block-based processor core for executing a program comprising a plurality of instruction blocks. The block-based processor core can include prefetch logic and a local buffer. The prefetch logic can be configured to receive a reference to a predicted instruction block and to determine a mapping of the predicted instruction block to one or more lines. The local buffer can be configured to selectively store portions of the predicted instruction block and to provide the stored portions of the predicted instruction block when control of the program passes along a predicted execution path to the predicted instruction block.

18 Claims, 16 Drawing Sheets

(51) Int. Cl.

| | | |
|---|---|---|
| *G06F 9/46* | (2006.01) | |
| *G06F 9/52* | (2006.01) | |
| *G06F 11/36* | (2006.01) | |
| *G06F 15/78* | (2006.01) | |
| *G06F 9/26* | (2006.01) | |
| *G06F 9/32* | (2018.01) | |
| *G06F 9/345* | (2018.01) | |
| *G06F 9/35* | (2018.01) | |
| *G06F 12/0806* | (2016.01) | |
| *G06F 12/0862* | (2016.01) | |
| *G06F 12/1009* | (2016.01) | |
| *G06F 13/42* | (2006.01) | |
| *G06F 15/80* | (2006.01) | |
| *G06F 9/355* | (2018.01) | |
| *G06F 12/0811* | (2016.01) | |
| *G06F 12/0875* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | |
|---|---|---|
| 5,615,350 A | 3/1997 | Hesson |
| 5,669,001 A | 9/1997 | Moreno |
| 5,729,228 A | 3/1998 | Franaszek et al. |
| 5,790,822 A | 8/1998 | Sheaffer et al. |
| 5,796,997 A | 8/1998 | Lesartre et al. |
| 5,845,101 A | 12/1998 | Johnson et al. |
| 5,845,103 A | 12/1998 | Sodani et al. |
| 5,905,893 A | 5/1999 | Worrell |
| 5,917,505 A | 6/1999 | Larson |
| 5,943,501 A | 8/1999 | Burger et al. |
| 6,016,399 A | 1/2000 | Chang |
| 6,061,776 A | 5/2000 | Burger et al. |
| 6,161,170 A | 12/2000 | Burger et al. |
| 6,164,841 A | 12/2000 | Mattson et al. |
| 6,175,898 B1 | 1/2001 | Ahmed et al. |
| 6,178,498 B1 | 1/2001 | Sharangpani et al. |
| 6,185,675 B1 | 2/2001 | Kranich et al. |
| 6,240,510 B1 | 5/2001 | Yeh et al. |
| 6,272,622 B1 * | 8/2001 | Han ............... G06F 12/0862 711/E12.057 |
| 6,275,918 B1 | 8/2001 | Burky et al. |
| 6,282,708 B1 | 8/2001 | Augusteijn et al. |
| 6,314,493 B1 | 11/2001 | Luick |
| 6,353,883 B1 | 3/2002 | Grochowski et al. |
| 6,493,820 B2 | 12/2002 | Akkary et al. |
| 6,529,922 B1 | 3/2003 | Hoge |
| 6,581,138 B2 | 6/2003 | Gelman |
| 6,662,294 B1 | 12/2003 | Kahle et al. |
| 6,820,192 B2 | 11/2004 | Cho et al. |
| 6,892,292 B2 | 5/2005 | Henkel et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,085,919 B2 | 8/2006 | Grochowski et al. |
| 7,095,343 B2 | 8/2006 | Xie et al. |
| 7,299,458 B2 | 11/2007 | Hammes |
| 7,302,543 B2 | 11/2007 | Lekatsas et al. |
| 7,380,038 B2 | 5/2008 | Gray |
| 7,487,340 B2 | 2/2009 | Luick |
| 7,624,386 B2 | 11/2009 | Robison |
| 7,676,650 B2 | 3/2010 | Ukai |
| 7,676,669 B2 | 3/2010 | Ohwada |
| 7,836,289 B2 | 11/2010 | Tani |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 7,975,134 B2 | 7/2011 | Gonion |
| 8,010,745 B1 | 8/2011 | Favor et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,312,452 B2 | 11/2012 | Neiger et al. |
| 8,321,850 B2 | 11/2012 | Bruening et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,583,895 B2 | 11/2013 | Jacobs et al. |
| 8,683,129 B2 | 3/2014 | Ono et al. |
| 8,817,793 B2 | 8/2014 | Mushano |
| 8,819,399 B1 | 8/2014 | Muth et al. |
| 9,021,241 B2 | 4/2015 | Burger et al. |
| 9,043,769 B2 | 5/2015 | Vorbach |
| 9,053,292 B2 | 6/2015 | Abdallah |
| 9,129,071 B2 | 9/2015 | Pierson et al. |
| 9,830,152 B2 | 11/2017 | Kothinti Naresh et al. |
| 2001/0032308 A1 | 10/2001 | Grochowski et al. |
| 2002/0016907 A1 | 2/2002 | Grochowski et al. |
| 2003/0023959 A1 | 1/2003 | Park |
| 2003/0070062 A1 | 4/2003 | Krishnan et al. |
| 2003/0074653 A1 | 4/2003 | Ju et al. |
| 2003/0088759 A1 | 5/2003 | Wilkerson |
| 2003/0154349 A1 | 8/2003 | Berg et al. |
| 2004/0083468 A1 | 4/2004 | Ogawa et al. |
| 2004/0193849 A1 | 9/2004 | Dundas |
| 2004/0216095 A1 | 10/2004 | Wu |
| 2005/0172277 A1 | 8/2005 | Chheda et al. |
| 2005/0204348 A1 | 9/2005 | Horning et al. |
| 2006/0020757 A1 | 1/2006 | Chaudhry et al. |
| 2006/0090063 A1 | 4/2006 | Theis |
| 2007/0226735 A1 | 9/2007 | Nguyen et al. |
| 2007/0239975 A1 | 10/2007 | Wang |

(56) References Cited

U.S. PATENT DOCUMENTS

| | | |
|---|---|---|
| 2007/0260854 A1 | 11/2007 | Smith et al. |
| 2007/0288733 A1 | 12/2007 | Luick |
| 2008/0109637 A1 | 5/2008 | Martinez et al. |
| 2008/0133893 A1 | 6/2008 | Glew |
| 2009/0013135 A1 | 1/2009 | Burger et al. |
| 2009/0013160 A1 | 1/2009 | Burger et al. |
| 2009/0019263 A1 | 1/2009 | Shen et al. |
| 2009/0106541 A1 | 4/2009 | Mizuno et al. |
| 2009/0138661 A1* | 5/2009 | Lauterbach ......... G06F 9/30047 711/137 |
| 2009/0158017 A1 | 6/2009 | Mutlu et al. |
| 2009/0172371 A1 | 7/2009 | Joao et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2012/0158647 A1 | 6/2012 | Yadappanavar et al. |
| 2012/0246657 A1 | 9/2012 | Abdallah |
| 2012/0303933 A1 | 11/2012 | Manet et al. |
| 2012/0311306 A1 | 12/2012 | Mushano |
| 2013/0159679 A1 | 6/2013 | McCormick et al. |
| 2013/0198499 A1 | 8/2013 | Dice et al. |
| 2014/0006714 A1 | 1/2014 | Cherukuri et al. |
| 2014/0019721 A1 | 1/2014 | Stavrou et al. |
| 2014/0164748 A1 | 6/2014 | Dundas |
| 2014/0181475 A1 | 6/2014 | Abdallah |
| 2014/0189239 A1 | 7/2014 | Hum et al. |
| 2014/0372736 A1 | 12/2014 | Greenhaigh |
| 2015/0006452 A1 | 1/2015 | Kim et al. |
| 2015/0026444 A1 | 1/2015 | Anderson et al. |
| 2015/0067662 A1 | 3/2015 | Palalau |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2016/0203081 A1 | 7/2016 | Kimura |
| 2016/0232006 A1 | 8/2016 | Wright |
| 2017/0046158 A1 | 2/2017 | Yen et al. |
| 2017/0083318 A1 | 3/2017 | Burger et al. |
| 2017/0083319 A1 | 3/2017 | Burger et al. |
| 2017/0083320 A1 | 3/2017 | Burger et al. |
| 2017/0083337 A1 | 3/2017 | Burger |
| 2017/0083338 A1 | 3/2017 | Burger et al. |
| 2017/0083341 A1 | 3/2017 | Burger et al. |
| 2019/0065060 A1 | 2/2019 | Krishna et al. |

FOREIGN PATENT DOCUMENTS

| | | |
|---|---|---|
| JP | 2002149401 A | 5/2002 |
| JP | 2013500539 A | 7/2013 |
| WO | WO 2013/101213 | 7/2003 |
| WO | WO 2004/059472 | 7/2004 |
| WO | WO 2014/193878 | 12/2014 |

OTHER PUBLICATIONS

Rabbah, et al., "Compiler Orchestrated Prefetching via Speculation and Predication", In Proceedings of the 11th International Conference on Architectural Support for Programming Languages and Operating Systems, Oct. 7, 2004, pp. 189-198.

Schlansker, et al., "Achieving High Levels of Instruction-Level Parallelism With Reduced Hardware Complexity", In the Hewlett Packard Laboratories Technical Report, Feb. 1, 1997, pp. 1-85.

"Advance Computer Architecture", Retrieved on: Oct. 6, 2015; Available at: http://sjbit.edu.in/app/course-material/CSE/VII/Advanced ComputerArchitectures %5B10CS74%5D/CSE-VII-Advanced ComputerArchitectures %5B10CS74%5D-NOTES.pdf.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Ganusov et al., "Future Execution: A Hardware Prefetching Technique for Chip Multiprocessors", In Proceedings of 14th International Conference on Parallel Architectures and Compilation Techniques, Sep. 17, 2005, 11 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Kavi, et al., "Concurrency, Synchronization, Speculation—the Dataflow Way", In Journal of Advances in Computers, vol. 96, Nov. 23, 2013, pp. 1-41.

Kim, et al., "Adaptive Compiler Directed Prefetching for EPIC Processors", In Technical Report of GIT-CC-02-65, Nov. 2005, pp. 1-13.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Munshi, et al., "A Parameterizable SIMD Stream Processor", In Proceedings of Canadian Conference on Electrical and Computer Engineering, May 1, 2005, pp. 806-811.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Pengfei et al., "M5 Based EDGE Architecture Modeling", In Proceedings of IEEE International Conference on Computer Design, Oct. 3, 2010, pp. 289-296.

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Roesner, "Counting Dependence Predictors," In Undergraduate Honors Thesis, May 2, 2008, 25 pages.

Sibi et al., "Scaling Power and Performance via Processor Composability," University of Texas at Austin technical report No. TR-10-14 (2010), 20 pages.

(56) References Cited

OTHER PUBLICATIONS

Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Vanderwiel, Steven P., "Data Prefetch Mechanisms," ACM Computing Surveys, vol. 32, No. 2, pp. 174-199, 2000.
"Why Intel Added the CLWB and PCOMMIT Instructions", Published on: Nov. 5, 2014; Available at: http://danluu.com/clwb-pcommit/.
Yourst, "PTLsim User's Guide and Reference—The Anatomy of an x86-64 Out of Order Superscalar Microprocessor", Retrieved on: Oct. 6, 2015; Available at: http://www.facom.ufms.br/~ricardo/Courses/CompArchII/Tools/PTLSim/PTLsilmManual.pdf.
Zhuang et al., "Power-Efficient Prefetching via Bit-Differential Offset Assignment on Embedded Processors", In Proceedings of the ACM SIGPLAN/SIGBED conference on Languages, compilers, and tools for embedded systems, Jun. 11, 2004, pp. 1-11 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
Bouwens et al., "Architecture Enhancements for the ADRES Coarse-Grained Reconfigurable Array," High Performance Embedded Architectures and Compilers, Springer Berlin Heidelberg pp. 66-81 (2008).
Burger et al., "Design and Implementation of the TRIPS EDGE Architecture", In Proceedings of the 32nd Annual International Symposium on Computer Architecture, Jun. 4, 2005, pp. 1-41.
Burger et al., "Scaling to the End of Silicon with EDGE Architectures," In Proceedings of Computer, vol. 37, Issue 7, Jul. 1, 2004, pp. 44-55.
Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.
Desikan et al., "Scalable Selective Re-Execution for EDGE Architectures," In Proceedings of the 11th International Conference on Architectural Support for Programming Languages and Operating Systems, Oct. 9, 2004, 13 pages.
"Explicit Data Graph Execution", Retrieved on: Aug. 6, 2015, Available at: https://en.wikipedia.org/wiki/Explicit_Data_Graph_Execution.
Fallin, et al., "The Heterogeneous Block Architecture", In Proceedings of 32nd IEEE International Conference on Computer Design, Oct. 19, 2014, pp. 1-8.
Gebhart et al., "An Evaluation of the TRIPS Computer System," In Proceedings of the 14th international conference on Architectural support for programming languages and operating systems, Mar. 7, 2009, 12 pages.
Govindan, "E3:Energy-Efficient EDGE Architectures", In Dissertation, Aug. 2010, 244 pages.
Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Maher, "Atomic Block Formation for Explicit Data Graph Execution Architectures", In Dissertation of Doctor of Philosophy, Aug. 2010, 185 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Nagarajan et al., "Critical Path Analysis of the TRIPS Architecture," In IEEE International Symposium on Performance Analysis of Systems and Software, Mar. 19, 2006, 11 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Smith et al., "Dataflow Predication", In Proceedings of 39th Annual IEEE/ACM International Symposium on Microarchitecture, Dec. 9, 2006, 12 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Ferdman, Michael, "Proactive Instruction Fetch", In Dissertation of Doctor of Philosophy, Jun. 2012, 110 pages.
Lin et al., "Reducing DRAM Latencies with an Integrated Memory Hierarchy Design," High-Performance Computer Architecture, 2001. HPCA. The Seventh International Symposium on. IEEE, 2001, 12 pages.
Liu, Haiming, "Hardware Techniques to Improve Cache Efficiency", In Dissertation of Doctor of Philosophy, May 2009, 189 pages.
McDonald, et al., "TRIPS Processor Reference Manual", In Tech Report TR-05-19, Mar. 10, 2005, 194 pages.

(56) References Cited

OTHER PUBLICATIONS

Nagarajan, Ramadass, "Design and Evaluation of a Technology-Scalable Architecture for Instruction-Level Parallelism", In Dissertation of Doctor of Philosophy, May 2007, 260 pages.

Nishimoto, et al., "Prefetching", Retrieved on: Oct. 5, 2015 Available at: http://alumni.cs.ucr.edu/~sneema/projects/prefetch.pdf.

Pierce, et al., "Wrong-Path Instruction Prefetching", In Proceedings of IEEE 29th Annual IEEE/ACM International Symposium on Microarchitecture, Dec. 3, 1996, 17 pages.

Pinter, et al., "Tango: a Hardware-based Data Prefetching Technique for Superscalar Processors", In Proceedings of the 29th Annual IEEE/ACM International Symposium on Microarchitecture, Dec. 3, 1996, pp. 214-225.

Reinmany, et al., "Fetch Directed Instruction Prefetching", In Proceedings of the 32nd Annual International Symposium on Microarchitecture, Nov. 1999, 12 pages.

Sankaralingam, et al., "Distributed Microarchitectural Protocols in the TRIPS Prototype Processor", In Proceedings of 39th Annual International Symposium on Microarchitecture, Dec. 9, 2006, 12 pages.

Sankaralingam, Karthikeyan, "Polymorphous Architectures: A Unified Approach for Extracting Concurrency of Different Granularities", In Dissertation of Doctor of Philosophy, Aug. 2007, 276 pages.

Smith, Aaron Lee, "Explicit Data Graph Compilation", In Dissertation of Doctor of Philosophy, Dec. 2009, 201 pages.

Smith, et al., "Compiling for EDGE Architectures", In International Symposium on Code Generation and Optimization, Mar. 26, 2006, 11 pages.

Wu, et al., "Block Based Fetch Engine for Superscalar Processors", In Proceedings of the 15th International Conference on Computer Applications in Industry and Engineering, Nov. 7, 2002, 4 pages.

Kol et al., "Kin: A High Performance Asynchronous Processor Architecture," Conference Proceedings of the 1998 International Conference on Supercoming, Melbourne, Australia, Jul. 13-17, 1998 and ACM International Conferrence on Supercomputing, New York, NY, Jul. 13, 1998, pp. 433-440.

"Non Final Office Action Issued in U.S. Appl. No. 15/061,370", dated Sep. 26, 2019, 14 Pages.

"Non Final Office Action Issued in U.S. Appl. No. 15/061,408", dated Sep. 26, 2019, 16 Pages.

"Non Final Office Action Issued in U.S. Appl. No. 14/757,941", dated Jan. 11, 2019, 16 Pages.

"Final Office Action Issued in U.S. Appl. No. 14/942,345", dated Dec. 31, 2018, 14 Pages.

"Non Final Office Action Issued in U.S. Appl. No. 14/942,461", dated Jan. 18, 2019, 9 Pages.

"Final Office Action Issued in U.S. Appl. No. 14/942,557", dated Dec. 31, 2018, 16 Pages.

"Non Final Office Action Issued in U.S. Appl. No. 15/073,365", dated Dec. 4, 2018, 13 Pages.

"Final Office Action Issued in U.S. Appl. No. 15/074,938", dated Dec. 3, 2018, 9 Pages.

Salzman, et al., "The Art of Debugging with GDB and DDD", In Book—The Art of Debugging with GDB and DDD, No Starch Press publication, Sep. 2008, 27 Pages.

"Final Office Action Issued in U.S. Appl. No. 15/061,370", dated May 22, 2019, 14 Pages.

"Final Office Action issued in U.S. Appl. No. 15/061,408", dated May 22, 2019, 15 Pages.

"Very Long Instruction Word", Retrieved From: http://en.wikipedia.org/wiki/Verylong_instruction_word, Feb. 13, 2013, 7 Pages.

"Final Office Action Issued in U.S. Appl. No. 14/757,944", dated Jul. 9, 2018, 18 Pages.

"Non Final Office Action Issued in U.S. Appl. No. 14/757,944", dated Sep. 21, 2017, 21 Pages.

August, et al., "A Framework for Balancing Control Flow and Predication", In IEEE/ ACM 30th Annual International Symposium on Microarchitecture, Dec. 3, 1997, 12 Pages.

Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.

Chuang, et al., "Predicate Prediction for Efficient Out-of-Order Execution", In Proceedings of the 17th Annual International Conference on Supercomputing, Jun. 23, 2003, 10 Pages.

Coons, et al., "Optimal Huffman Tree-Height Reduction for Instruction-Level Parallelism", In Technical Report TR-08-34, Aug. 2007, 26 Pages.

Ebcioglu, et al., "An Eight-Issue Tree-VLIW Processor for Dynamic Binary Translation", In Proceedings of the International Conference on Computer Design, Nov. 1998, 9 Pages.

Ferrante, et al., "The Program Dependence Graph and Its Use in Optimization", In Proceedings of ACM Transactions on Programming Languages and Systems, vol. 9, Issue 3, Jul. 1, 1987, 31 Pages.

Havanki, et al., "Treegion Scheduling for Wide Issue Processors", In Proceedings of the 4th International Symposium on High-Performance Computer Architecture, Feb. 1, 1998, 11 Pages.

Huh, et al., "A NUCA Substrate for Flexible CMP Cache Sharing", In Proceedings of 19th International Conference on Supercomputing, Jun. 20, 2005, 10 Pages.

Mahlke, et al., "Effective Compiler Support for Predicated Execution Using the Hyperblock", In Proceedings of the 25th Annual International Symposium on Microarchitecture, Dec. 1992, 10 Pages.

Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.

Mai, et al., "Smart Memories: A Modular Reconfigurable Architecture", In Proceedings of the 27th International Symposium on Computer Architecture, Jun. 14, 2011, 11 Pages.

McDonald, et al., "The Design and Implementation of the TRIPS Prototype Chip", Retrieved From: http://www.cs.utexas.edu/-trips/talks/hotchips05.pdf, Aug. 17, 2005, 24 Pages.

Moreno, et al., "Scalable Instruction-level Parallelism through Tree-Instructions", In Proceedings of the 11th International Conference on Supercomputing, Jul. 11, 1997, 14 Pages.

Netto, et al., "Code Compression to Reduce Cache Accesses", In Technical Report—IC-03-023, Nov. 2003, 15 Pages.

Pan, et al., "High Performance, Variable-Length Instruction Encodings", In Doctoral Dissertation of Massachusetts Institute of Technology, May 2002, 53 Pages.

Parcerisa, et al., "Design of Clustered Superscalar Microarchitectures", In Thesis Submitted to Polytechnic University of Catalonia, Apr. 2004, 28 Pages.

"International Search Report and Written Opinion Issued in PCT Application No. PCT/US2016/051207", dated Dec. 16, 2016, 11 Pages.

Pnevmatikatos, et al., "Guarded Execution and Branch Prediction in Dynamic ILP Processors", In Proceedings of the 21st Annual International Symposium on Computer Architecture, Apr. 1994, 11 Pages.

Quinones, et al., "Improving Branch Predication and Predicated Execution in Out-of-Order Processors", In IEEE 13th International Symposium on High Performance Computer Architecture, Feb. 2007, 10 Pages.

Quinones, et al., "Selective Predicate Prediction for Out-of-Order Processors", In Proceedings of the 20th Annual International Conference on Supercomputing, Jun. 28, 2009, 9 Pages.

Ranganathan, Nitya, "Control Flow Speculation for Distributed Architectures", In Dissertation Presented to the Faculty of the Graduate School of The University of Texas at Austin, May 2009, 40 Pages.

Ross, et al., "A Hamming Distance Based VLIW/EPIC Code Compression Technique", In Proceedings of the International Conference on Compilers, Architecture, and Synthesis for Embedded Systems, Sep. 22, 2004, 8 Pages.

Sankaralingam, et al., "Universal Mechanisms for Data-Parallel Architectures", In Proceedings of the 36th International Symposium on Microarchitecture, Dec. 3, 2003, 12 Pages.

(56) References Cited

OTHER PUBLICATIONS

Simon, et al., "Incorporating Predicate Information Into Branch Predictors", In Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International Conference on Architectural Support for Programming Languages and Operating Systems Homepage, Apr. 1991, 8 Pages.
Uht, et al., "Disjoint Eager Execution: An Optimal Form of Speculative Execution", In Proceedings of the 28th International Symposium on Microarchitecture, Nov. 1995, 13 Pages.
Wilson, et al., "Designing High Bandwidth On-Chip Caches", In Proceedings of the 24th Annual International Symposium on Computer Architecture, Jun. 1997, 12 Pages.
Xie, et al., "A Code Decompression Architecture for VLIW Processors", In Proceedings of 34th ACM/IEEE International Symposium on Microarchitecture, Dec. 1, 2001, 10 Pages.
"Office Action Issued in European Patent Application No. 16775380.5", dated Dec. 20, 2019, 8 Pages.

* cited by examiner

PREFETCHING INSTRUCTION BLOCKS

CROSS-REFERENCE TO RELATED APPLICATIONS

This application claims the benefit of U.S. Provisional Application No. 62/221,003, entitled "BLOCK-BASED PROCESSORS," filed Sep. 19, 2015, the entire disclosure of which is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for prefetching instruction blocks of a block-based processor instruction set architecture (BB-ISA). The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers.

In some examples of the disclosed technology, a processor includes a block-based processor core for executing a program comprising a plurality of instruction blocks. The block-based processor core includes prefetch logic and a local buffer. The prefetch logic can be configured to receive a reference to a predicted instruction block and to determine a mapping of the predicted instruction block to one or more lines. The local buffer can be configured to selectively store portions of the predicted instruction block and to provide the stored portions of the predicted instruction block when control of the program passes along a predicted execution path to the predicted instruction block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

I. General Considerations

Figure 1:
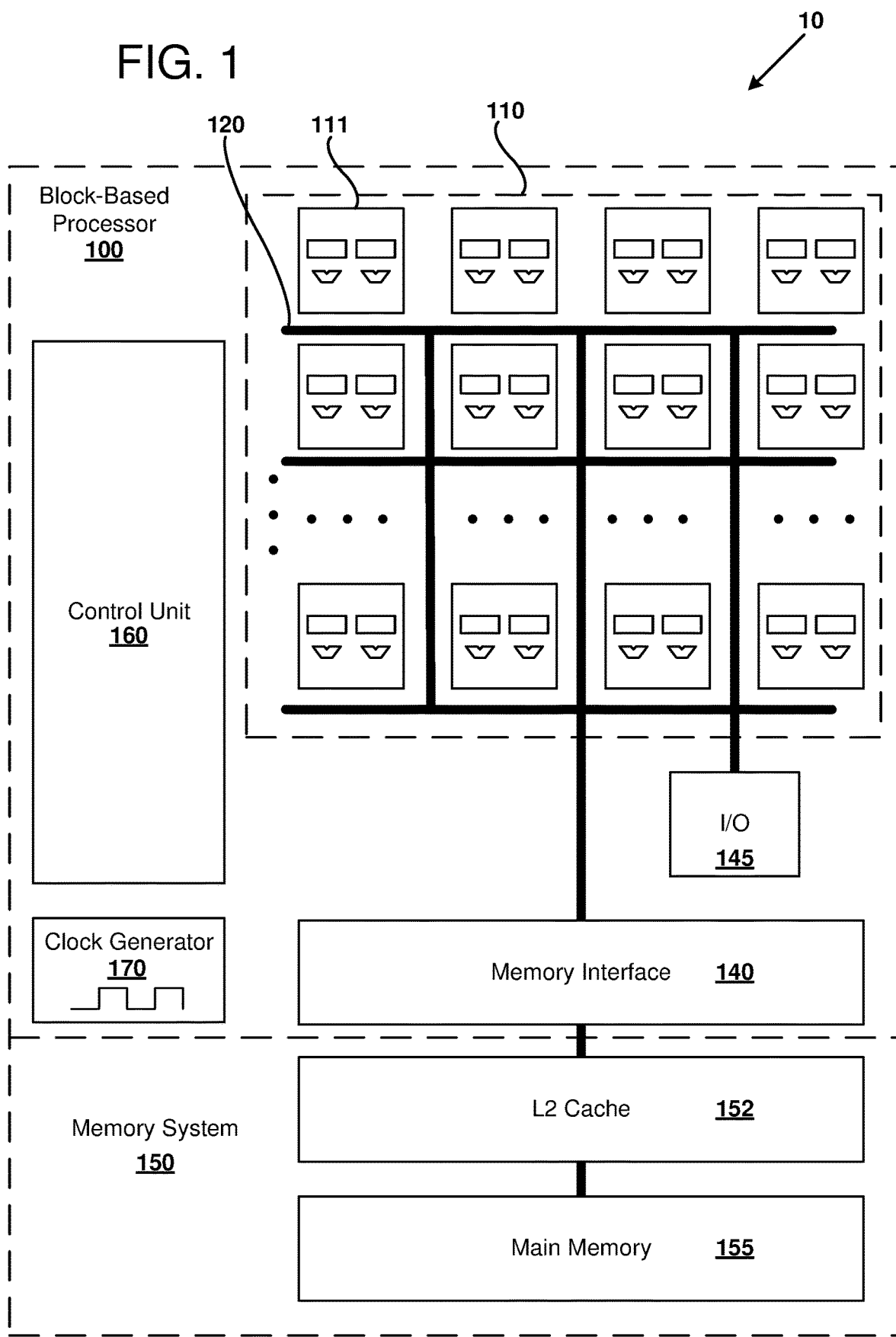
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Intermediate results produced by the instructions within an atomic instruction block are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

In some examples of the disclosed technology, a processor includes a block-based processor core for executing a program comprising a plurality of instruction blocks. The block-based processor core can include prefetch logic and a local buffer. The prefetch logic can be configured to receive a reference to a predicted instruction block and to determine a mapping of the predicted instruction block to one or more lines. The local buffer can be configured to selectively store portions of the predicted instruction block and to provide the stored portions of the predicted instruction block when control of the program passes along a predicted execution path to the predicted instruction block. Thus, instruction blocks can be prefetched into the local buffer, and the execution speed of the program can potentially be increased by masking the latency to fetch the predicted instruction block.

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
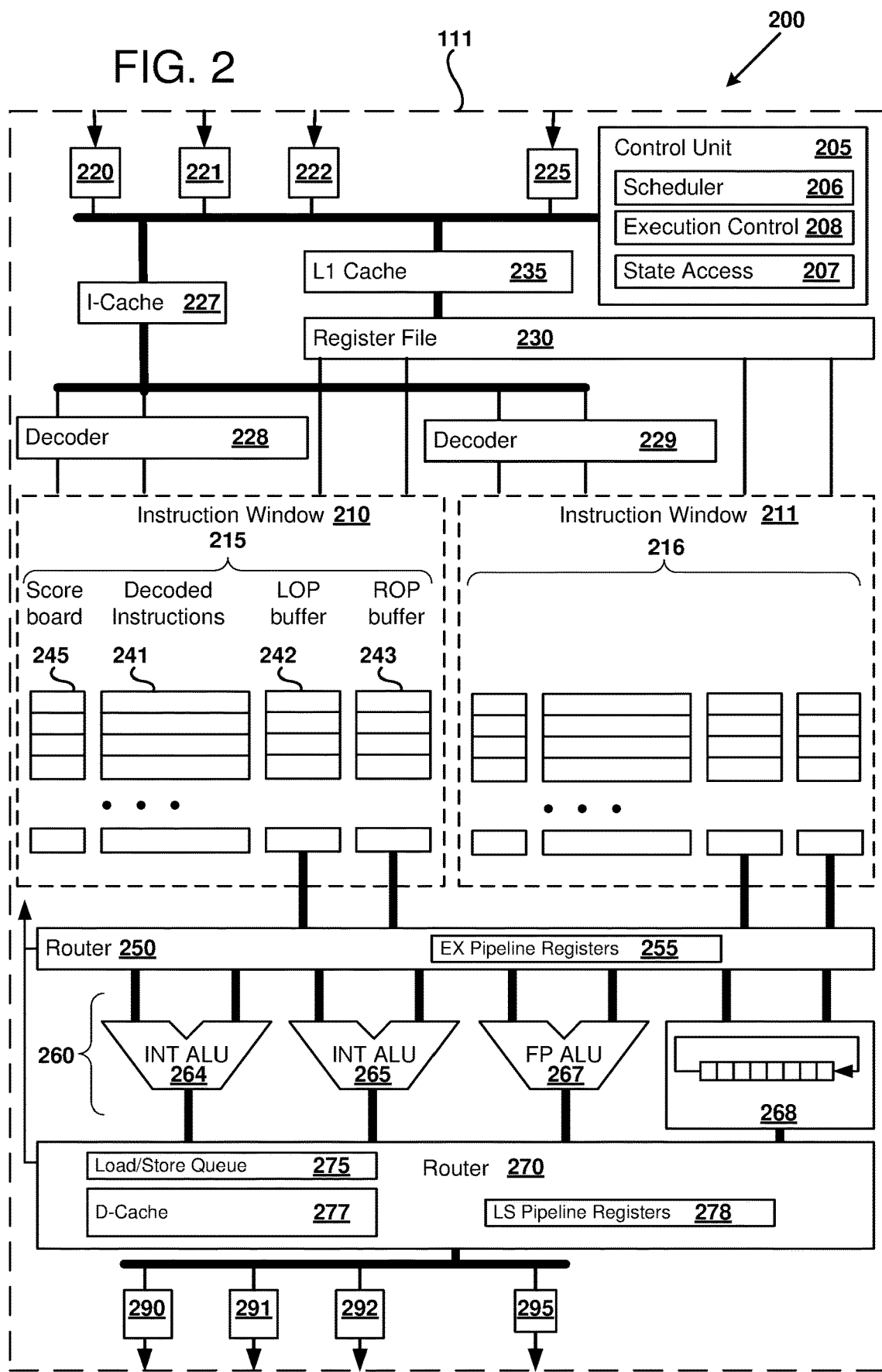
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores (processor core 111), as can be used in certain examples of the disclosed technology. For ease of explanation, the exemplary block-based processor core 111 is illustrated with an instruction pipeline comprising five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

In some examples of the disclosed technology, the processor core 111 can be used to execute and commit an instruction block of a program. An instruction block is an atomic collection of block-based-processor instructions that includes a plurality of instructions and can include an instruction block header. As will be discussed further below, the instruction block header can include information describing an execution mode of the instruction block and information that can be used to further define semantics of one or more of the plurality of instructions within the instruction block. Depending on the particular ISA and processor hardware used, the instruction block header can also be used, during execution of the instructions, to improve performance of executing an instruction block by, for example, allowing for early fetching of instructions and/or data, improved branch prediction, speculative execution, improved energy efficiency, and improved code compactness.

The instructions of the instruction block can be dataflow instructions that explicitly encode relationships between producer-consumer instructions of the instruction block. In particular, an instruction can communicate a result directly to a targeted instruction through an operand buffer that is reserved only for the targeted instruction. The intermediate results stored in the operand buffers are generally not visible to cores outside of the executing core because the block-atomic execution model only passes final results between the instruction blocks. The final results from executing the instructions of the atomic instruction block are made visible outside of the executing core when the instruction block is committed. Thus, the visible architectural state generated by each instruction block can appear as a single transaction outside of the executing core, and the intermediate results are typically not observable outside of the executing core.

As shown in FIG. 2, the processor core 111 includes a control unit 205, which can receive control signals from other cores and generate control signals to regulate core operation and schedules the flow of instructions within the core using an instruction scheduler 206. The control unit 205 can include state access logic 207 for examining core status and/or configuring operating modes of the processor core 111. The control unit 205 can include execution control logic 208 for generating control signals during one or more operating modes of the processor core 111. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory).

In some examples, the control unit 205, instruction scheduler 206, state access logic 207, and/or execution control logic 208 are implemented at least in part using one or more of: hardwired finite state machines, programmable microcode, programmable gate arrays, or other suitable control circuits.

The control unit 205 can decode the instruction block header to obtain information about the instruction block. For example, execution modes of the instruction block can be specified in the instruction block header though various execution flags. The decoded execution mode can be stored in registers of the execution control logic 208. Based on the execution mode, the execution control logic 208 can generate control signals to regulate core operation and schedule the flow of instructions within the core 111, such as by using the instruction scheduler 206. For example, during a default execution mode, the execution control logic 208 can sequence the instructions of one or more instruction blocks executing on one or more instruction windows (e.g., 210, 211) of the processor core 111. Specifically, each of the instructions can be sequenced through an instruction pipeline comprising the instruction fetch, decode, operand fetch, execute, and memory/data access stages so that the instructions of an instruction block can be pipelined and executed in parallel. The instructions are ready to execute when their operands are available, and the instruction scheduler 206 can select the order in which to execute the instructions. As another example, the execution control logic 208 can include prefetch logic for retrieving instructions before the instructions are executed. The prefetch logic may also prefetch data associated with load and store instructions before the load and store instructions are executed.

The state access logic 207 can include an interface for other cores and/or a processor-level control unit (such as the control unit 160 of FIG. 1) to communicate with and access state of the core 111. For example, the state access logic 207 can be connected to a core interconnect (such as the core interconnect 120 of FIG. 1) and the other cores can communicate via control signals, messages, reading and writing registers, and the like.

The state access logic 207 can include control state registers or other logic for modifying and/or examining modes and/or status of an instruction block and/or core status. As an example, the core status can indicate whether an instruction block is mapped to the core 111 or an instruction window (e.g., instruction windows 210, 211) of the core 111, whether an instruction block is resident on the core 111, whether an instruction block is executing on the core 111, whether the instruction block is ready to commit, whether the instruction block is performing a commit, and whether the instruction block is idle. As another example, the status of an instruction block can include a token or flag indicating the instruction block is the oldest instruction block executing and a flag indicating the instruction block is executing speculatively.

The control state registers (CSRs) can be mapped to unique memory locations that are reserved for use by the block-based processor. For example, CSRs of the control unit 160 (FIG. 1) can be assigned to a first range of addresses, CSRs of the memory interface 140 (FIG. 1) can be assigned to a second range of addresses, a first processor core can be assigned to a third range of addresses, a second processor core can be assigned to a fourth range of addresses, and so forth. In one embodiment, the CSRs can be accessed using general purpose memory read and write instructions of the block-based processor. Additionally or alternatively, the CSRs can be accessed using specific read and write instructions (e.g., the instructions have opcodes different from the memory read and write instructions) for the CSRs. Thus, one core can examine the configuration state of a different core by reading from an address corresponding to the different core's CSRs. Similarly, one core can modify the configuration state of a different core by writing to an address corresponding to the different core's CSRs. Additionally or alternatively, the CSRs can be accessed by shifting commands into the state access logic 207 through serial scan chains. In this manner, one core can examine the state access logic 207 of a different core and one core can modify the state access logic 207 or modes of a different core.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 245. When all of the inputs for a particular decoded instruction are ready, the instruction is ready to issue. The control logic 205 then initiates execution of one or more next instruction (s) (e.g., the lowest numbered ready instruction) each cycle and its decoded instruction and input operands are sent to one or more of functional units 260 for execution. The decoded instruction can also encode a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 245 can include decoded ready state, which is initialized by the instruction decoder 228, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 can include a load/store queue 275, which can be used to issue memory instructions, a data cache 277, which stores data being output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor cores 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a mispeculated issued instruction and the specific transitive closure of instructions in the block that consume its outputs may be re-executed, or mispeculated side effects annulled. In some examples, discovery of a mispeculated instruction leads to the complete roll back and re-execution of an entire block of instructions.

V. Example Stream of Instruction Blocks

Figure 3:
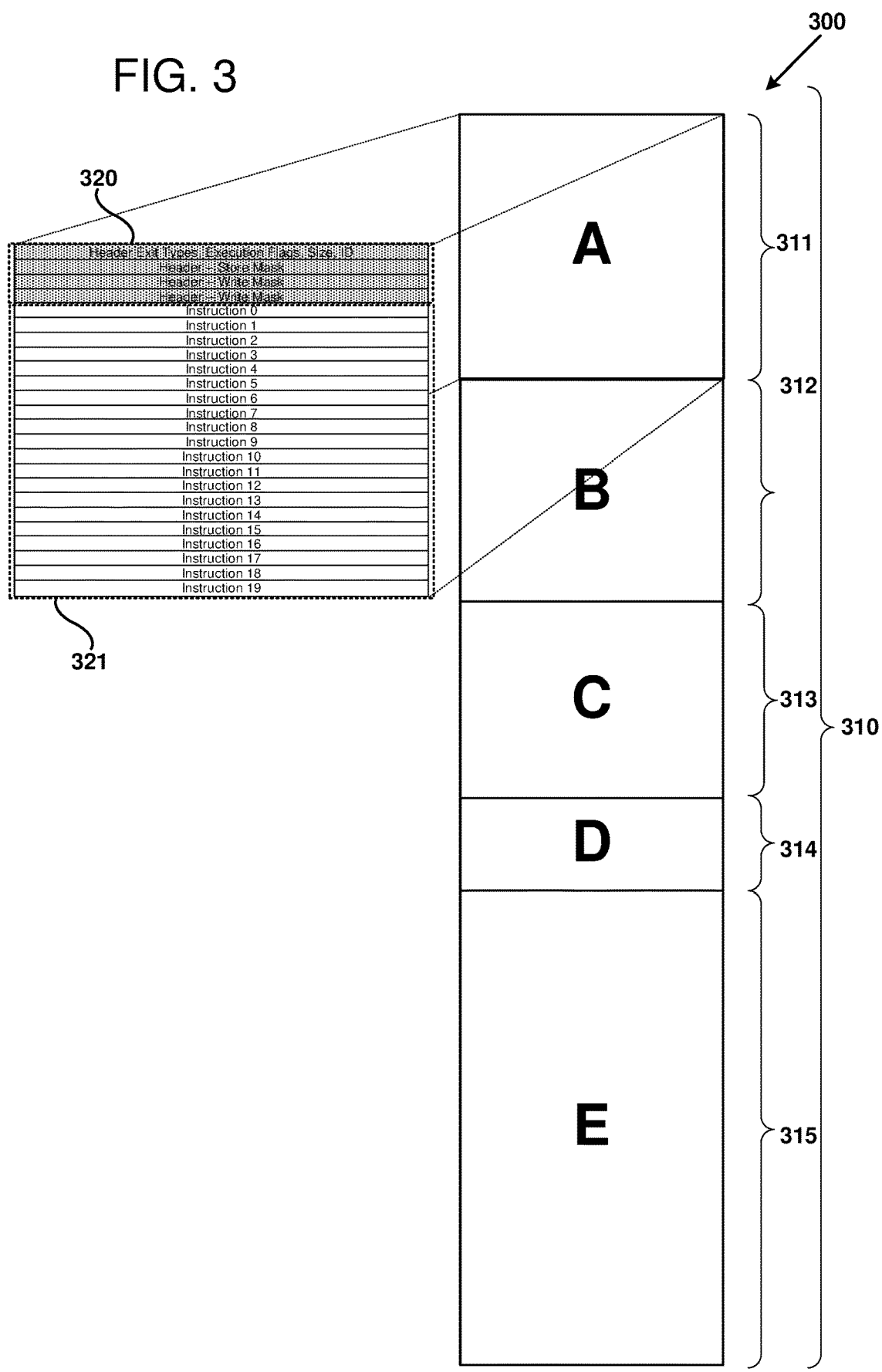
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other type of program suitable for execution on the block-based processor. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application. As another example, an execution flag can be used to control whether prefetching is enabled for data and/or instructions of certain instruction blocks.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

In an alternative embodiment, the stream of instruction blocks can include instruction blocks without instruction headers. For example, the instruction headers can be stored separately from the instructions or the information that can be stored in a header can be calculated dynamically or be based on inherent properties of the instruction blocks. As an example, the instruction blocks can include a fixed number of instructions so that the instruction blocks are a predefined size (such as when constant-sized instructions are used) or can be readily calculated by fully or partially decoding the instructions (such as when variable length instructions are used). As another example, the instruction blocks can be a fixed size comprising a variable number of variable-length instructions. The individual instruction blocks can be aligned in memory and a particular instruction block can be identified based on an address of the instruction block. As another example, a data structure (such as a table) can be maintained separately from the instruction blocks. For each instruction block, the data structure can identify a starting address, a size, an ending address, execution flags, a write mask, a store mask, exit types, and/or any other information that could be stored in a header of a respective instruction block. As another example, block separator instructions can be used to identify the beginning or the end of an instruction block. Regardless of how an instruction block is formatted, an instruction block uses the block-atomic execution model and includes dataflow instructions that explicitly encode relationships between producer-consumer instructions of the instruction block. Thus, intermediate results of instructions within a given instruction block are generally not visible to other instruction blocks. The final results from the given instruction block are made visible in a single transaction when the instruction block is committed.

VI. Example Block Instruction Target Encoding

Figure 4:
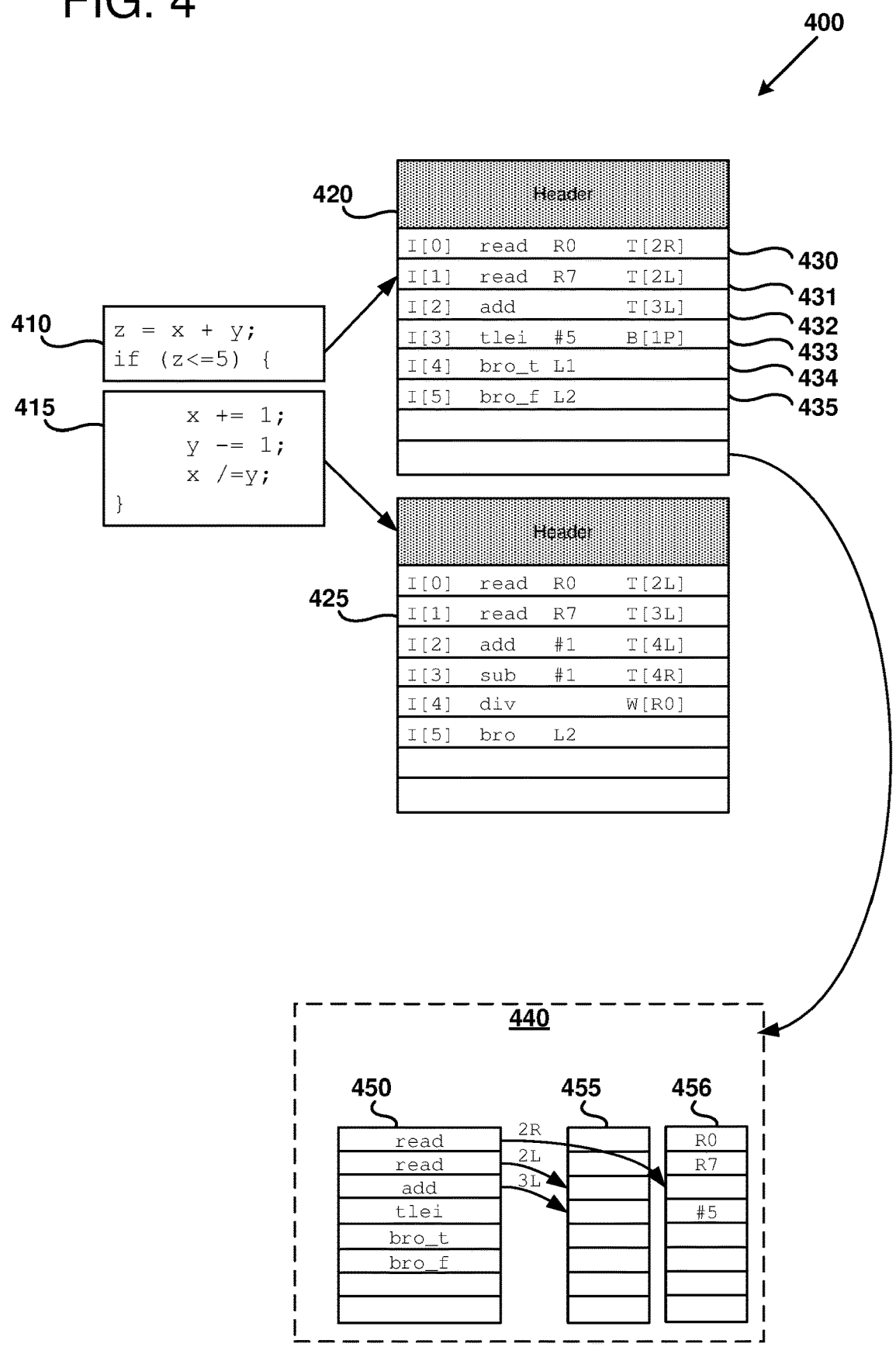
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[<number>] specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, the first two READ instructions 430 and 431 of the instruction block 420 target the right (T[2R]) and left (T[2L]) operands, respectively, of the ADD instruction 432. In the illustrated ISA, the read instruction is the only instruction that reads from the global register file;

however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

As a comparison, a conventional out-of-order RISC or CISC processor would dynamically build the dependence graph at runtime, using additional hardware complexity, power, area and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
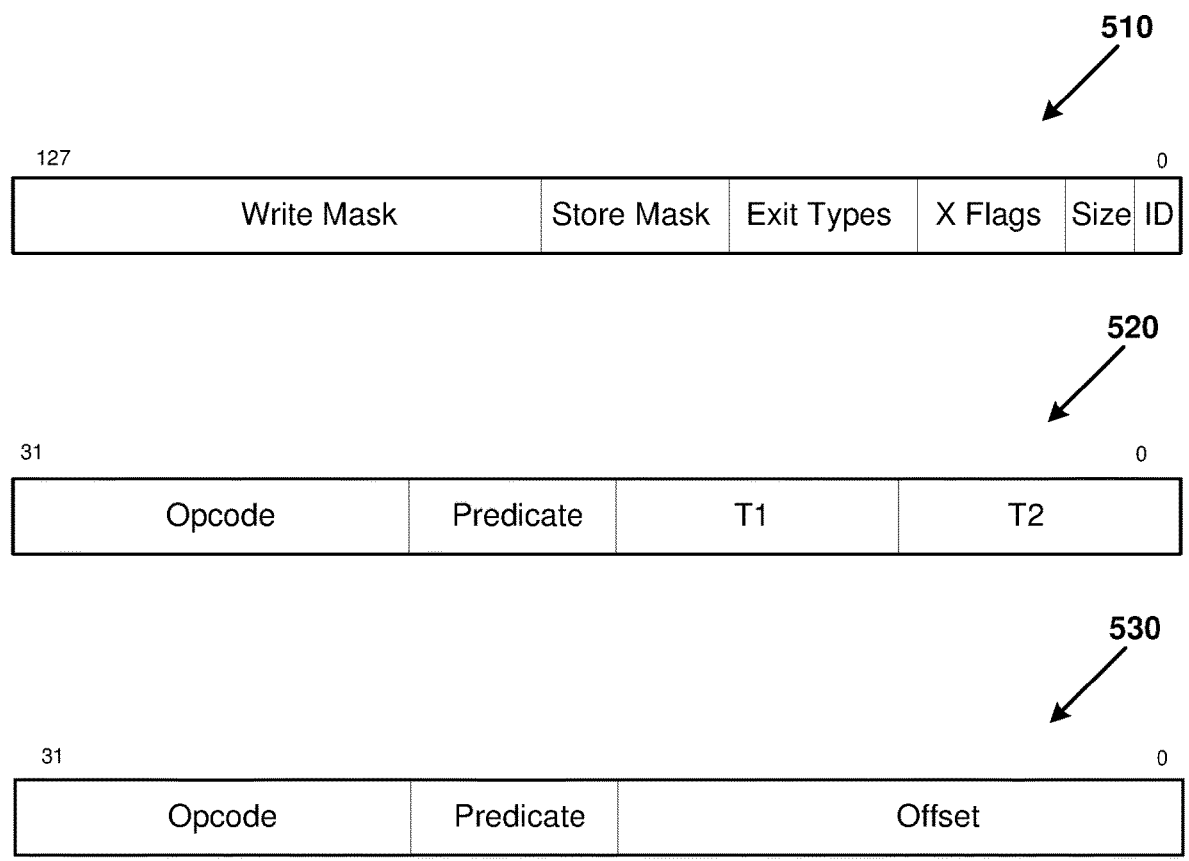
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields (X flags), an instruction block size field, and an instruction header ID bit (the least significant bit of the instruction header).

The execution flag fields can indicate special instruction execution modes. For example, an "inhibit branch predictor" flag can be used to inhibit branch prediction for the instruction block when the flag is set. As another example, an "inhibit memory dependence prediction" flag can be used to inhibit memory dependence prediction for the instruction block when the flag is set. As another example, a "break after block" flag can be used to halt an instruction thread and raise an interrupt when the instruction block is committed. As another example, a "break before block" flag can be used to halt an instruction thread and raise an interrupt when the instruction block header is decoded and before the instructions of the instruction block are executed. As another example, a "prefetching disable" flag can be used to control whether prefetching is enabled or disabled for the instruction blocks following the current instruction block.

The exit type fields include data that can be used to indicate the types of control flow and/or synchronization instructions encoded within the instruction block. For example, the exit type fields can indicate that the instruction block includes one or more of the following: sequential branch instructions, offset branch instructions, indirect branch instructions, call instructions, return instructions, and/or break instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the length or width of the instruction 520 and the operation(s) performed by the instruction 520, such as memory read/write, register load/store, add, subtract, multiply, divide, shift, rotate, system operations, or other suitable instructions.

The predicate field specifies the condition under which the instruction will execute. For example, the predicate field can specify the value "true," and the instruction will only execute if a corresponding condition flag matches the specified predicate value. In some examples, the predicate field specifies, at least in part, a field, operand, or other resource which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example States of a Processor Core

Figure 6:
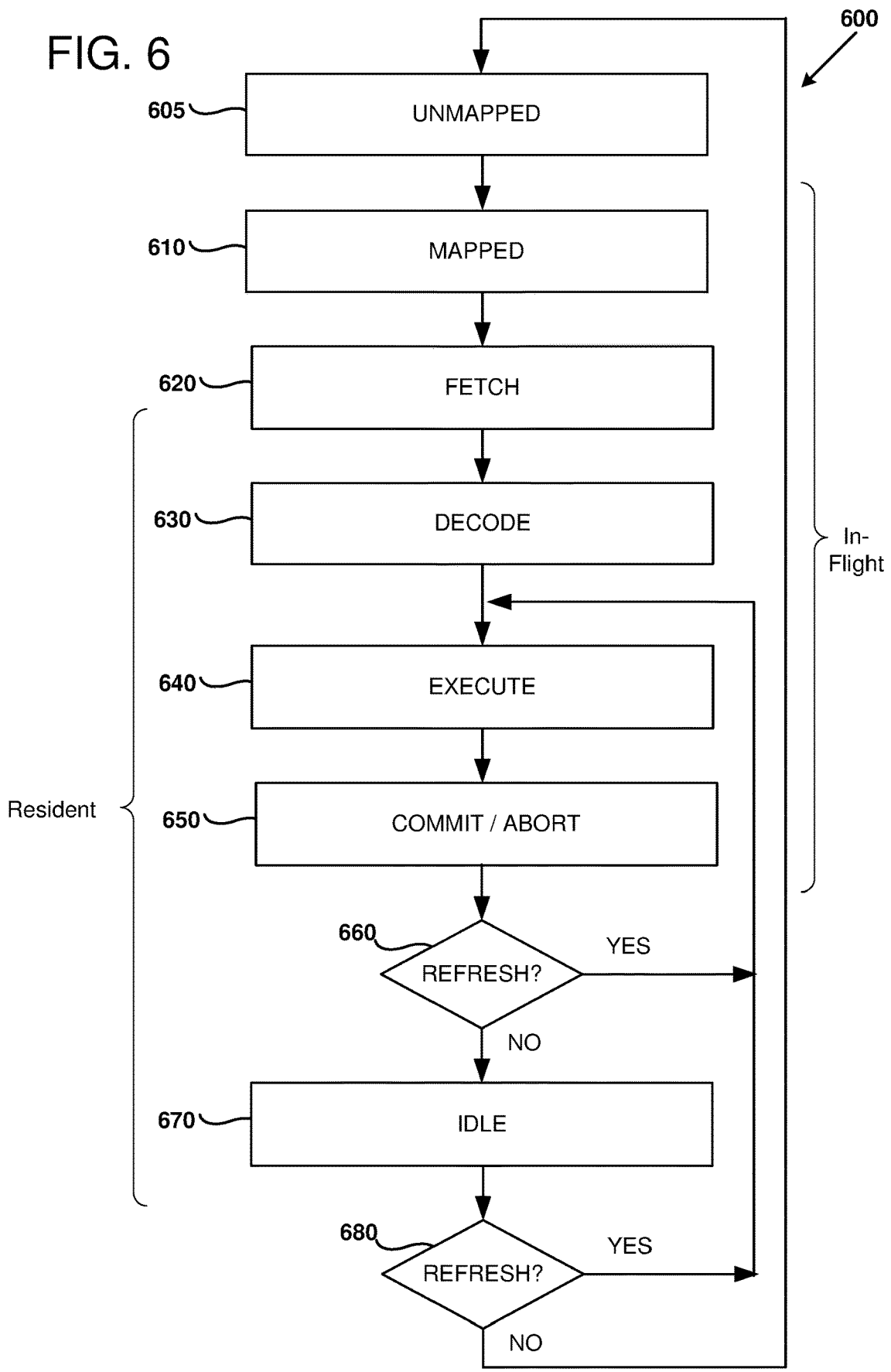
FIG. 6 is a flowchart illustrating an example of a progression of states of a processor core of a block-based processor.

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring instructions of the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. During the execute state, instructions of the instruction block are being executed. In particular, the EX and/or LS pipeline stages of the processor core can be active during the execute state. Data associated with load and/or store instructions can be fetched and/or pre-fetched during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

At state 650, the state of the respective processor core can be commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

At state 660, it can be determined if the instruction block resident on the processor core can be refreshed. As used herein, an instruction block refresh or a processor core refresh means enabling the processor core to re-execute one or more instruction blocks that are resident on the processor core. In one embodiment, refreshing a core can include resetting the active-ready state for one or more instruction blocks. It may be desirable to re-execute the instruction block on the same processor core when the instruction block is part of a loop or a repeated sub-routine or when a speculative block was terminated and is to be re-executed. The decision to refresh can be made by the processor core itself (contiguous reuse) or by outside of the processor core (non-contiguous reuse). For example, the decision to refresh can come from another processor core or a control core performing instruction block scheduling. There can be a potential energy savings when an instruction block is refreshed on a core that already executed the instruction as opposed to executing the instruction block on a different core. Energy is used to fetch and decode the instructions of the instruction block, but a refreshed block can save most of the energy used in the fetch and decode states by bypassing these states. In particular, a refreshed block can re-start at the execute state (640) because the instructions have already been fetched and decoded by the core. When a block is refreshed, the decoded instructions and the decoded ready state can be maintained while the active ready state is cleared. The decision to refresh an instruction block can occur as part of the commit operations or at a later time. If an instruction block is not refreshed, the processor core can be idled.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Example Block-Based Computer Architecture

Figure 7:
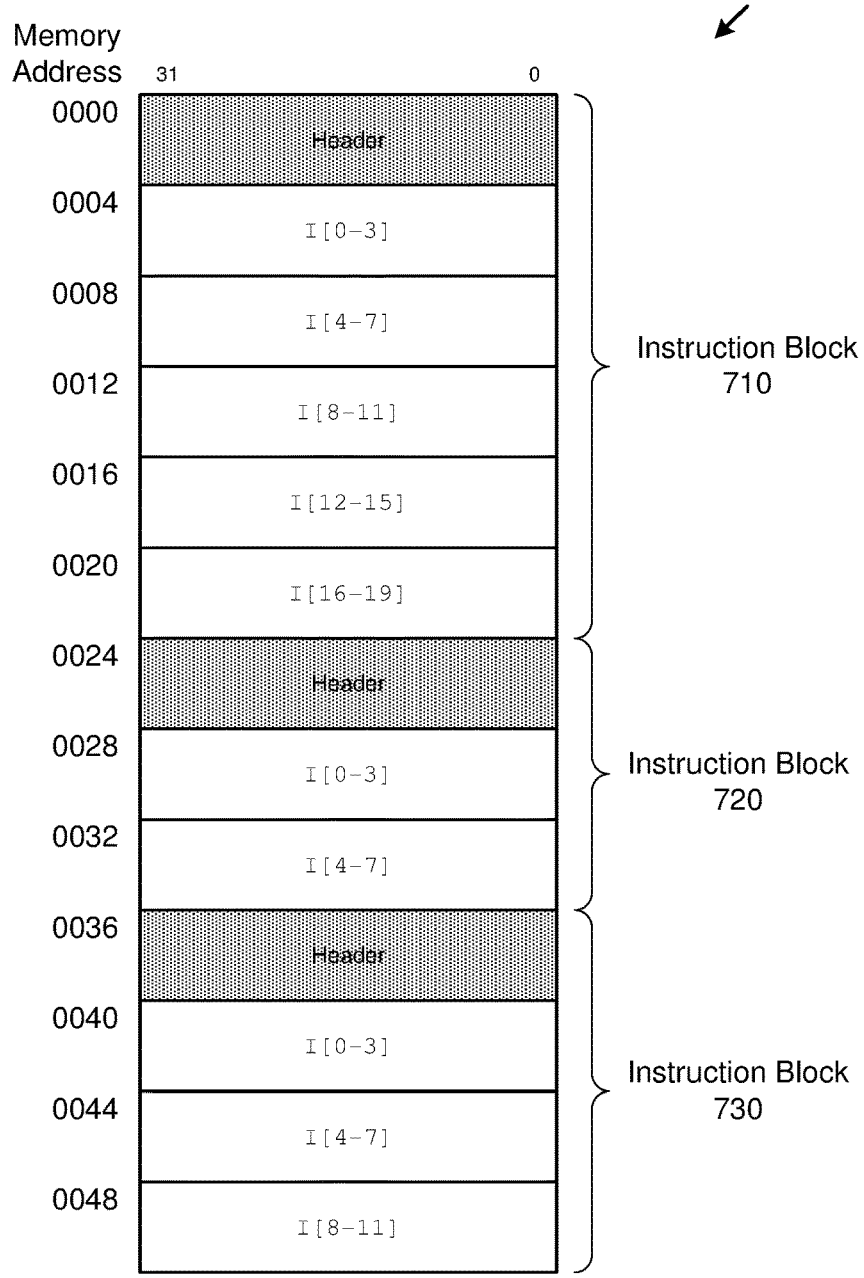
FIG. 7 is an example memory layout illustrating stored instruction blocks for executing on a block-based processor core, as can be used in some examples of the disclosed technology.
Figure 9:
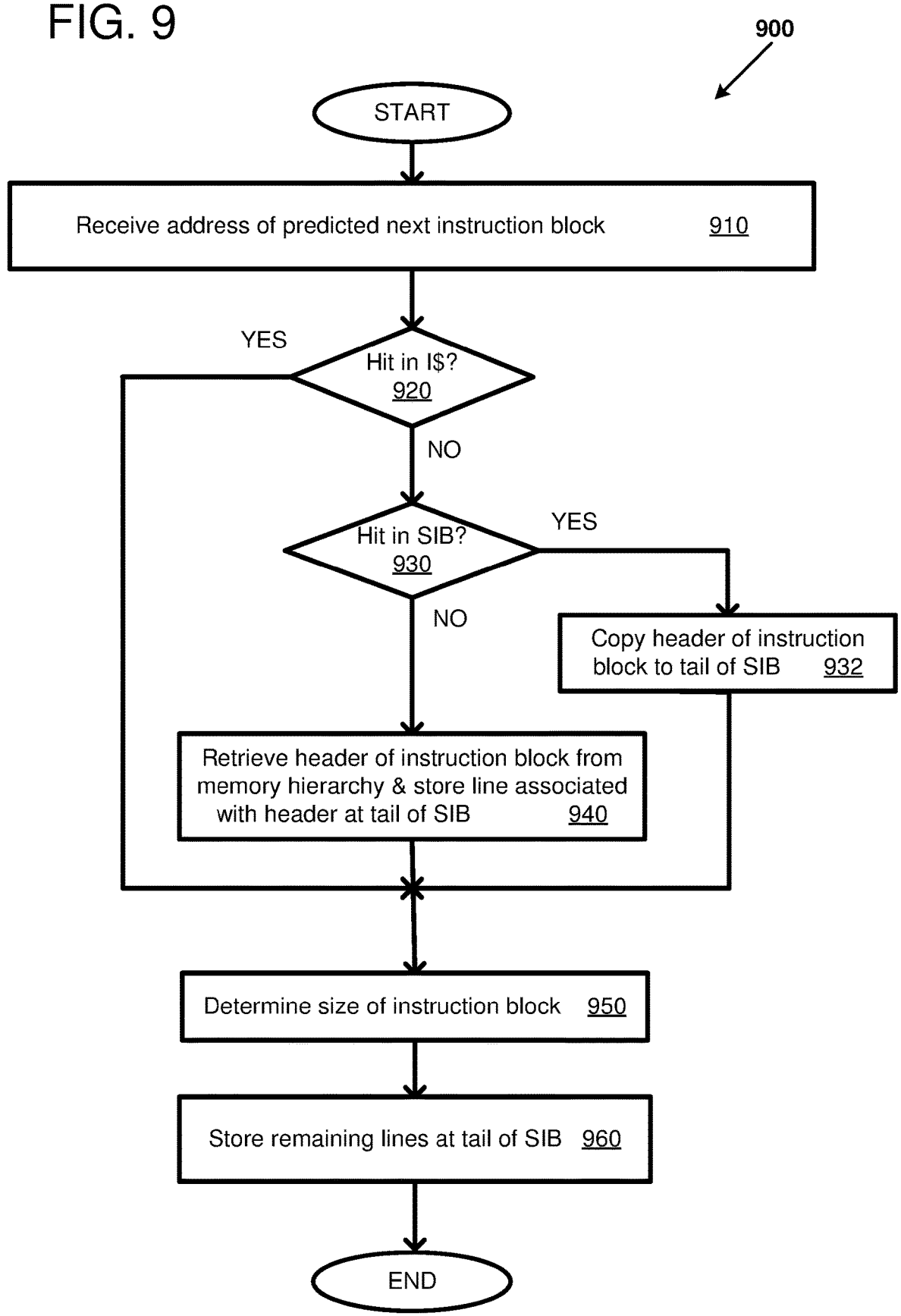
FIGS. 9-10 are flowcharts illustrating example methods of prefetching predicted instruction blocks of a program for a block-based processor core, as can be performed in some examples of the disclosed technology.
Figure 10:
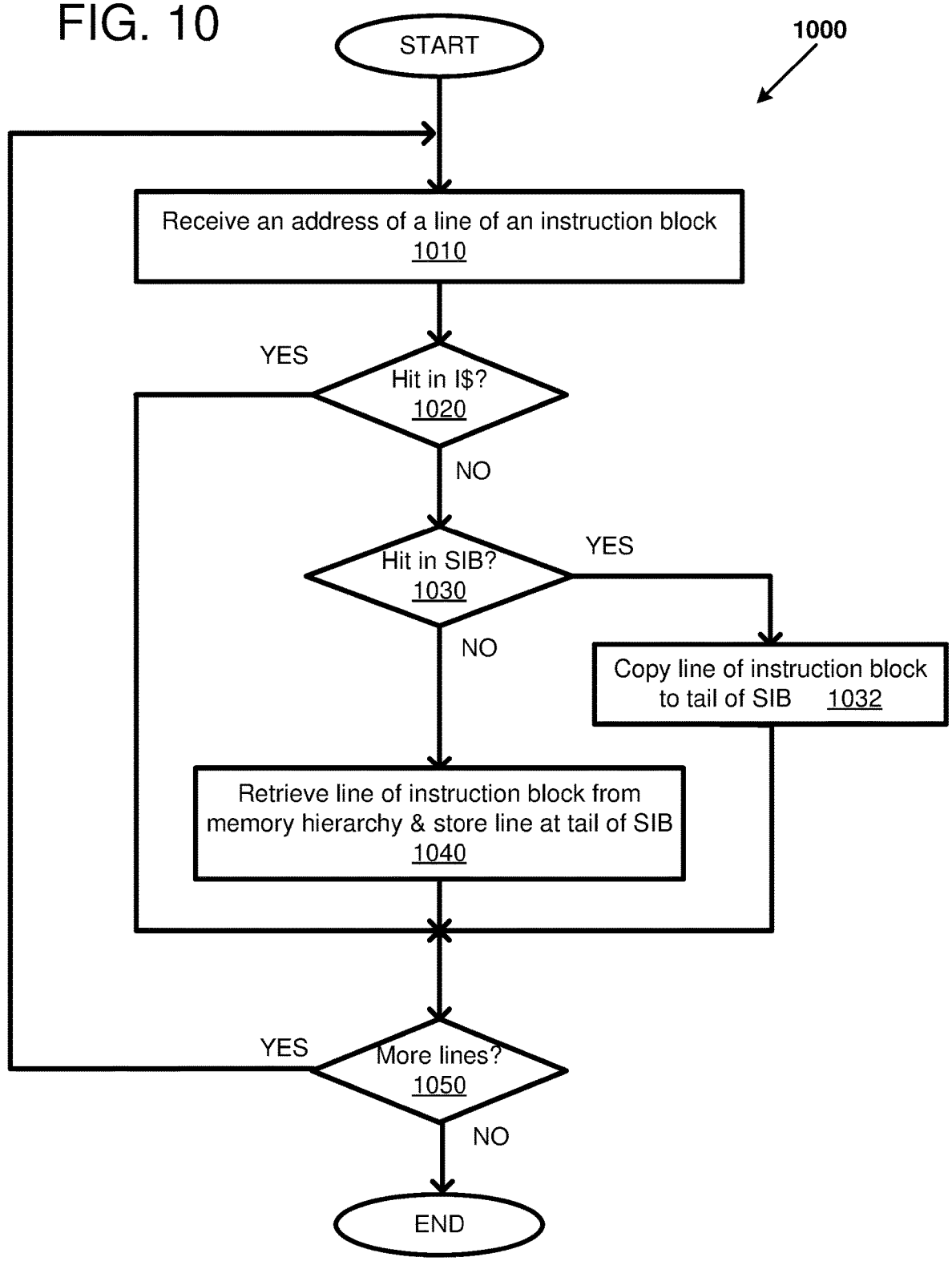
Figure 11:
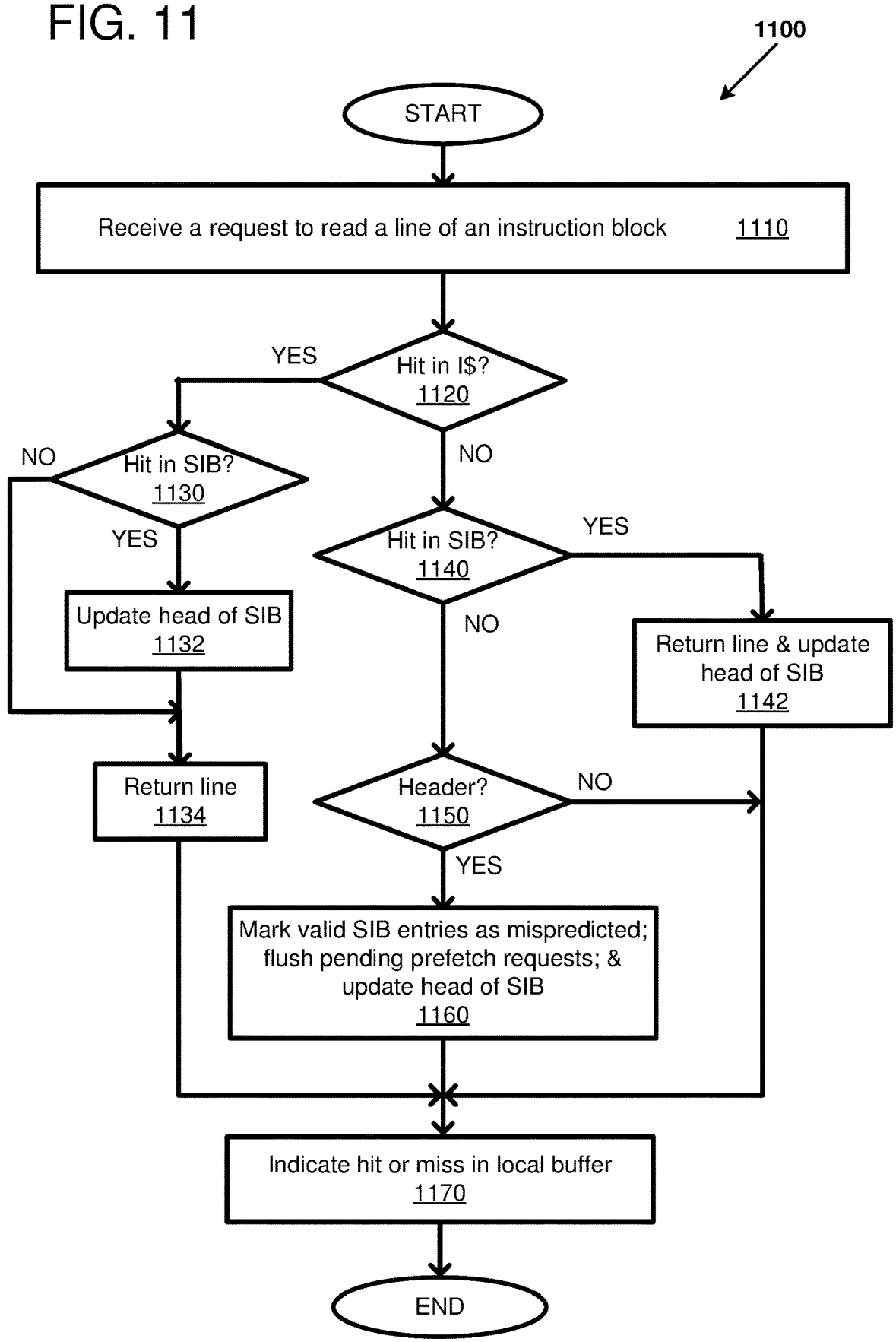
FIG. 11 is a flowchart illustrating an example method of reading prefetched instruction blocks of a program for a block-based processor, as can be performed in some examples of the disclosed technology.
Figure 12:
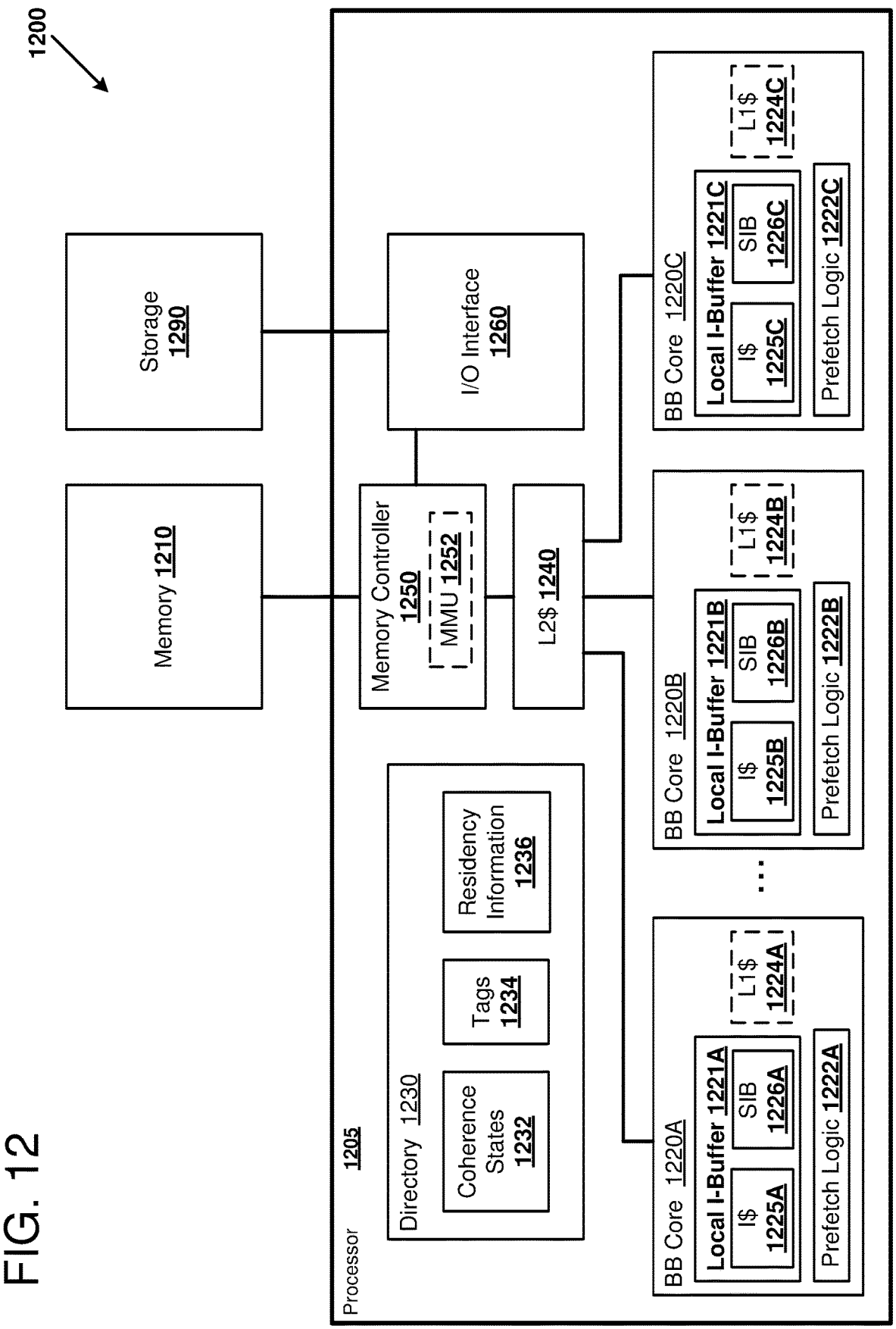
FIG. 12 illustrates an example system comprising a processor having multiple block-based processor cores and a memory hierarchy, as can be used in some examples of the disclosed technology.
Figure 13A:
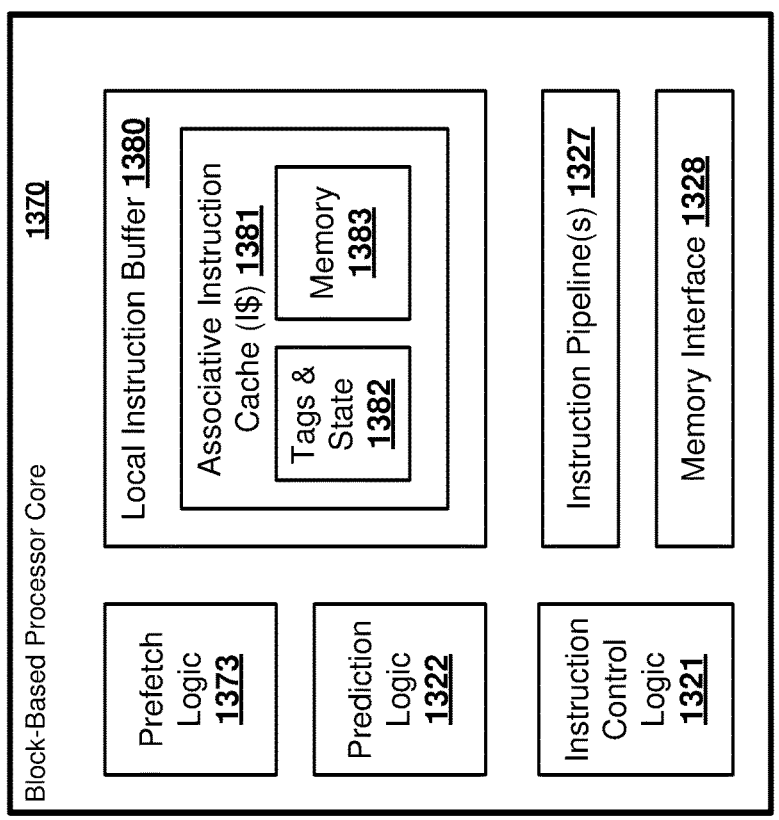
FIGS. 13A and 13B illustrate example block-based processor cores for executing an instruction block, as can be used in some examples of the disclosed technology.
Figure 13B:
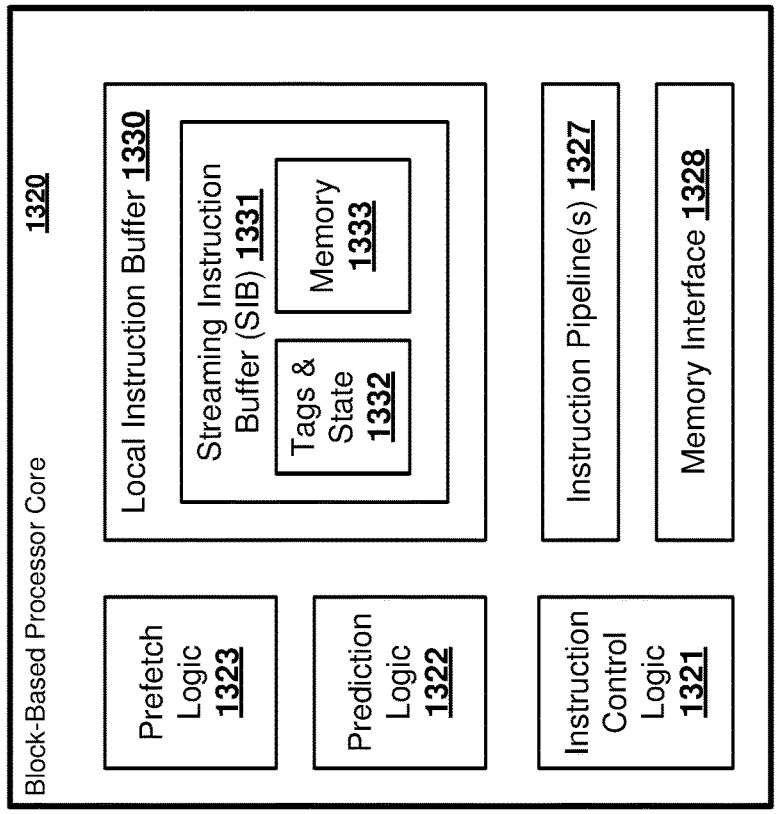

A program targeted for execution on a block-based processor core can include multiple instruction blocks of various respective sizes. The instruction blocks of the program can be stored in a computer-readable memory that is readable by the block-based processor core during a runtime of the program. FIG. 7 is an example memory layout illustrating a group of stored instruction blocks. Specifically, three different sized instruction blocks are stored in the memory. The instruction blocks can be executed on a system, such as the system illustrated in FIG. 8. The system can include a block-based processor core comprising a local buffer. An execution speed of the program can potentially be increased by prefetching instructions into the local buffer of the block-based processor core. For example, during execution of a first instruction block, a second instruction block can be predicted along a predicted path of execution. The second instruction block can be prefetched into the local buffer during execution of the first instruction block so that a memory latency due to the instruction fetch of the second instruction block is completely or partially masked. In other words, the time to access the instructions of the second instruction block can be overlapped with the time to execute the first instruction block. FIGS. 9-10 are flowcharts illustrating example methods of prefetching a predicted instruction block of a program. If the predicted path of execution is taken, the instructions can be read from the local buffer and executed by the block-based processor core. FIG. 11 is a flowchart illustrating an example method of reading prefetched instruction blocks of the program. The program can be executed on various different platforms. For example, the platforms may have different numbers of block-based processor cores, different memory arrangements, and different local buffer architectures. FIG. 12 illustrates an example system comprising a processor having multiple block-based processor cores and a memory hierarchy. FIGS. 13A and 13B illustrate examples of different block-based processor cores having different local buffer architectures.

A compiler can generate machine code of a program as a sequential stream of instructions which can be grouped into instruction blocks according to the block-based computer's hardware resources and the data and control flow of the code. The compiled instructions can be stored in a computer-readable memory and retrieved during a runtime of the program. FIG. 7 is an example memory layout illustrating three different instruction blocks 710, 720, and 730 stored in a memory 700 for execution on a block-based processor core.

A given instruction block can include a single basic block, a portion of a basic block, or multiple basic blocks, so long as the instruction block can be executed within the constraints of the ISA and the hardware resources of the targeted computer. A basic block can be a block of code where control can only enter the block at the first instruction of the block and control can only leave the block at the last instruction of the basic block. Thus, a basic block is a sequence of instructions that are executed together. The control flow of a program compiled for a conventional RISC processor may change at the boundary of each basic block of the program. In comparison, the control flow of a program compiled for a block-based processor may change at the boundary of each instruction block, rather than each basic block of the program. Since multiple basic blocks can be combined within a given instruction block, control flow changes may occur less frequently for a block-based processor. Specifically, intra-block branches between basic blocks within a given instruction block can be converted to dataflow instructions using predicated execution. In other words, more instructions may be executed between control flow decisions of a block-based processor as compared to a conventional RISC processor. The time to execute the additional instructions may be utilized to predict a flow or path of execution and to prefetch instruction blocks along the predicted path of execution. Thus, the time to prefetch the predicted instruction blocks can be overlapped with the time to execute earlier instruction blocks, potentially increasing the execution speed of the program.

The memory 700 can be organized in various different ways. For example, the memory 700 can be accessed or addressed in units of a byte, a word, a double-word, or a quad-word. As illustrated, the memory 700 can be word-addressable, where each word has a different respective address. Each of the instruction blocks 710, 720, and 730 includes a header and multiple instructions, where the header is four words long and an instruction is one word long. In alternative embodiments, the instruction blocks 710, 720, and 730 can be headerless, and the information of the headers can be retrieved from a separate table or generated dynamically based on the instructions of the instruction blocks 710, 720, and 730. The instruction blocks 710, 720, and 730 can be sequentially ordered in memory so that the instruction block 710 begins at address 0, the instruction block 720 begins at address 24, and the instruction block 730 begins at address 36. The instruction blocks can be aligned within the memory 700 on a multiple of the minimum accessible size or granularity of the memory 700. As illustrated, the instruction blocks 710, 720, and 730 are aligned on multiples of four words, so that a starting address of each of the instruction blocks is divisible by four. A granularity of the instruction block alignment can be based on a variety of factors, such as a minimum access size of the memory, a cache line size, a size of a page of virtual memory, a size of a block of storage, and/or constraints of the ISA, for example.

The memory 700 may be slower compared to local storage of a block-based processor core and so a memory hierarchy can be used to potentially increase the speed of accessing the instruction blocks 710, 720, and 730 stored in the memory 700. A memory hierarchy includes multiple levels of memory having different speeds and sizes. Levels within or closer to the processor core are generally faster and smaller than levels farther from the processor core. For example, a memory hierarchy can include a local buffer (such as a level-one (L1) cache, an instruction cache, and/or a streaming instruction buffer) within a processor core, a level-two (L2) cache within a processor that is shared by multiple processor cores, main memory (e.g., memory 700) that may be off-chip or external to the processor, and backing store that is located on a storage device, such as a hard-disk drive. The instruction blocks 710, 720, and 730 can be copied from a slower level of the hierarchy to a faster level of the hierarchy when the instruction blocks 710, 720, and 730 will be or are likely to be used by a processor core. A unit of transfer between the slower level of the hierarchy and the faster level of the hierarchy can be a block or a line. Each line can include all or a portion of an instruction block. For example, a line can include a header, instructions, and/or a combination of a header and instructions of a given instruction block. Specifically, the line can include multiple words of the memory 700 corresponding to a range of memory addresses. Thus, a memory line can be copied or fetched from the memory 700 into a local buffer of the processor core to increase the execution speed of instructions stored within the memory line. A principle of locality indicates that a program tends to use memory locations that are close to other memory locations used by the program (spatial locality) and that a given memory location is likely to be used multiple times by the program within a short time period (temporal locality). However, the faster levels of the memory hierarchy likely have reduced storage capacity compared to the slower levels of the memory hierarchy. Thus, copying a new memory line into the cache will typically cause a different memory line to be displaced or evicted. Policies can be implemented to balance the risk of evicting instructions that are likely to be reused with the goal of prefetching instructions that may be used in the future.

A local buffer 740 can be used to temporarily store instruction blocks that have been executed, will be executed, or are predicted to be executed. Specifically, all or a portion of an instruction block can be copied from the memory 700 to the local buffer 740. The local buffer 740 can be organized in various different ways. For example, the local buffer 740 can be a circular buffer providing a first-in-first-out access pattern, a direct-mapped cache, an associative cache, or combinations thereof. The local buffer 740 can include a memory that is filled or loaded in units of lines. As one example, a line can be four 32-bit words (128 bits), and the local buffer 740 can include eight lines 750-757. Thus, the instruction block 710 is six lines long, where the header is the first line, the instructions [0-3] are the second line, the instructions [4-7] are the third line, and so forth. Similarly, the instruction block 720 is three lines long and the instruction block 730 is four lines long.

During execution of the program, the instruction blocks 710, 720, and 730 can be mapped to the local buffer 740 in different ways depending on various factors, such as the organization of the local buffer 740, the control flow of the program, a historical access pattern of the instruction blocks, the capabilities of the processor core (such as the capabilities of prediction logic), starting addresses of the instruction blocks, sizes of the instruction blocks, ending addresses of the instruction blocks, and/or execution flags of the instruction blocks.

As a specific example, the local buffer 740 can be a streaming instruction buffer and predicted instruction blocks along a predicted path of execution can be stored in a sequential order within the local buffer 740. In particular, the predicted instruction blocks can be stored or loaded at a tail of the local buffer 740 and read from a head of the local buffer 740. The tail of the local buffer 740 is the newest or last valid data written to the local buffer 740 and the head of the local buffer 740 is the earliest valid data written to the local buffer 740 that has not yet been read. Initially, the local buffer 740 may be empty and the head and tail can be at the line 750. If the predicted instruction path is to execute the instruction blocks 710, 720, and 730 in sequential order, the instruction block 710 can be mapped and loaded into the local buffer 740. Specifically, the header of the instruction block 710 beginning at address 0 can be mapped to line 750, the instructions [0-3] beginning at address 4 can be mapped to line 751, and so forth until the instructions [16-19] beginning at address 20 can be mapped to line 755. Thus, each line 750-755 of the local buffer 740 can store a portion of the instruction block 710. If no lines have been read from the local buffer 740, the instruction block 710 is completely contained with the local buffer 740, the head is at 750, and the tail is at 755. The next instruction block 720 along the predicted path can be mapped and partially loaded into the local buffer 740. Specifically, the header of the instruction block 720 beginning at address 24 can be mapped to line 756 and the instructions [0-3] beginning at address 28 can be mapped to line 757. In this example, the local buffer 740 is full, and the instructions [4-7] beginning at address 32 cannot be loaded until the local buffer 740 is read. The reading pattern can be a first-in-first-out pattern beginning at the head of the local buffer 740. Thus, the header of the instruction block 710 can be read, followed by the instructions [0-3] of the instruction block 710, and so forth. As lines from the local buffer 740 are read, the lines can be reused for new read data. For example, the tail of the local buffer 740 can wrap from line 757 to 750 so that the instructions [4-7] beginning at address 32 can be mapped to line 750. The instruction block 730 can be mapped and loaded into the local buffer 740 in a similar manner as space within the local buffer 740 frees up from reading the instruction block 710. It should be noted that in this example, the line size of the local buffer 740 is aligned with the granularity of the instruction blocks so each line contains only a portion of a single instruction block. However, the line size of the local buffer 740 can be larger than the granularity of the instruction blocks so each line may contain entire instruction blocks and/or portions of multiple instruction blocks. It may be desirable to balance the line size of the local buffer 740 to the granularity of the instruction blocks to potentially increase the efficient utilization of the local buffer memory.

Figure 8:
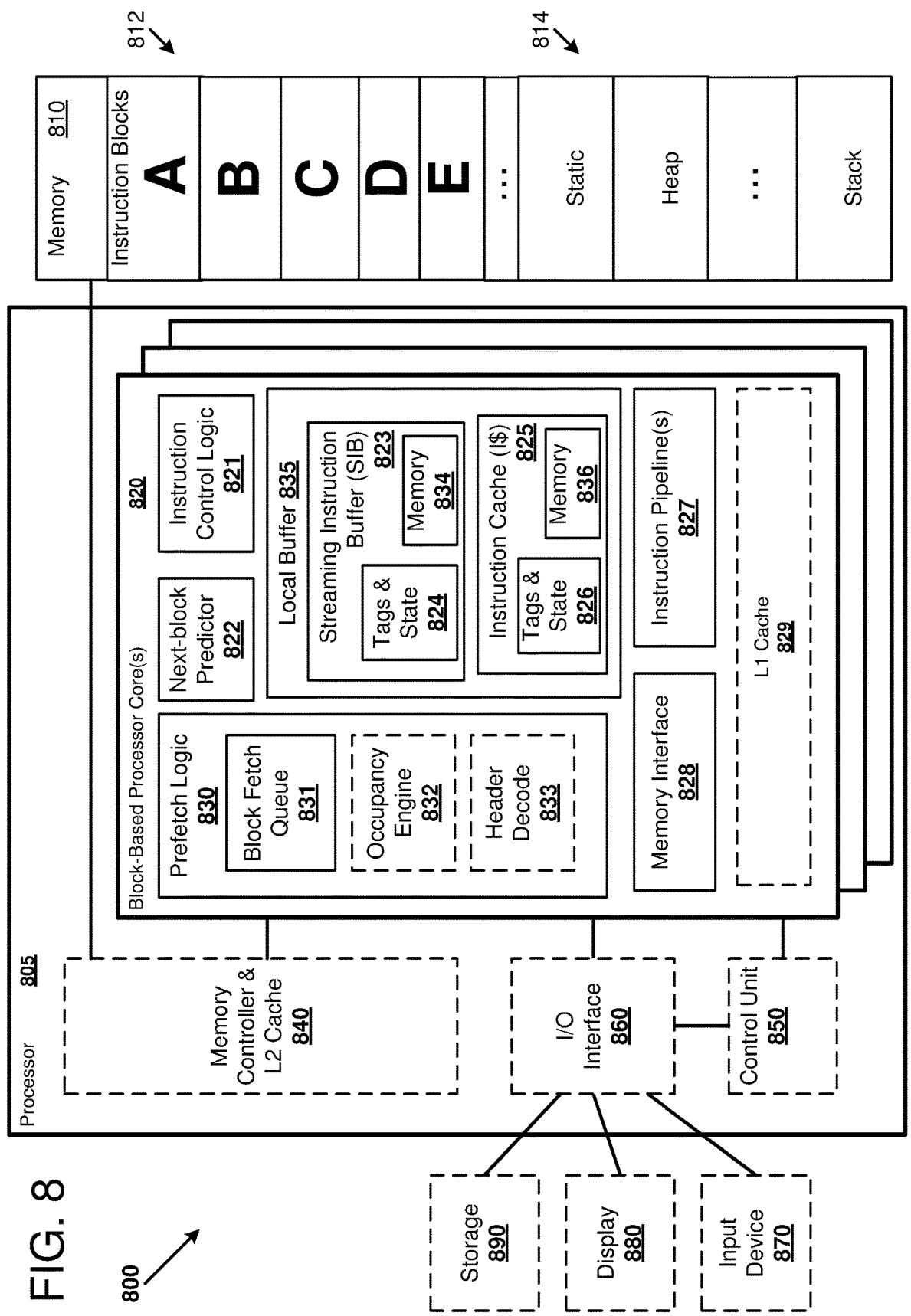
FIG. 8 illustrates an example system for executing an instruction block on a block-based processor core, as can be used in some examples of the disclosed technology.

FIG. 8 is an example architecture 800 for executing a program. For example, the program can be compiled to generate the instruction blocks A-E. The instruction blocks A-E can be stored in a memory 810 that can be accessed by the processor 805. The processor 805 can include a plurality of block-based processor cores (including block-based processor core 820), an optional memory controller and level-two (L2) cache 840, cache coherence logic (not shown in FIG. 8), a control unit 850, and an input/output (I/O) interface 860. The block-based processor core 820 can communicate with a memory hierarchy used for storing and retrieving instructions and data of the program. The memory hierarchy can include the memory 810, the memory controller and level-two (L2) cache 840, and an optional level-one (L1) cache 829. The memory controller and the level-two (L2) cache 840 can be used to generate the control signals for communicating with the memory 810 and to provide temporary storage for information coming from or going to the memory 810. As illustrated in FIG. 8, the memory 810 is off-chip or external to the processor 805. However, the memory 810 can be fully or partially integrated within the processor 805.

The control unit 850 can be used for implementing all or a portion of a run-time environment for the program. The runtime environment can be used for managing the usage of the block-based processor cores and the memory 810. For example, the memory 810 can be partitioned into a code segment 812 comprising the instruction blocks A-E and a data segment 815 comprising a static section, a heap section, and a stack section. As another example, the control unit 850 can be used for allocating processor cores to execute instruction blocks. The optional I/O interface 860 can be used for connecting the processor 805 to various input devices (such as an input device 870), various output devices (such as a display 880), and a storage device 890. In some examples, the components of the processor core 820, the memory controller and L2 cache 840, the cache coherence logic, the control unit 850, and the I/O interface 860 are implemented at least in part using one or more of: hardwired finite state machines, programmable microcode, programmable gate arrays, or other suitable control circuits. In some examples, the cache coherence logic, the control unit 850, and the I/O interface 860 are implemented at least in part using an external computer (e.g., an off-chip processor executing control code and communicating with the processor 805 via a communications interface (not shown)).

All or part of the program can be executed on the processor 805. Specifically, the control unit 850 can allocate one or more block-based processor cores, such as the processor core 820, to execute the program. The control unit 850 can communicate a starting address of an instruction block to the processor core 820 so that the instruction block can be fetched from the code segment 812 of the memory 810. Specifically, the processor core 820 can issue a read request to the memory controller and L2 cache 840 for the block of memory containing the instruction block. The memory controller and L2 cache 840 can return the instruction block to the processor core 820. The instruction block can include an instruction header and instructions. The instruction header can be decoded by header decode logic of the processor core 820 to determine information about the instruction block, such as whether there are any asserted execution flags associated with the instruction block. For example, the header can encode whether speculative execution and/or prefetching is enabled following the instruction block. During execution, the instructions of the instruction block are scheduled dynamically by the instruction control logic 821 for execution, based on when the instruction operands become available. As the instructions execute, intermediate values of the instruction pipeline(s) 827 (such as operand buffers of instruction windows) are calculated and stored locally within state of the processor core 820. The results of the instructions are committed atomically for the instruction block. Thus, the intermediate values generated by the processor core 820 are not visible outside of the processor core 820 and the final results (such as writes to the memory 810 or to a global register file (not shown)) are released as a single transaction. Additional instruction blocks can be executed along a control path or flow of the program until the program completes.

The block-based processor core 820 can include various control logic (such as instruction control logic 821, a next-block predictor 822, prefetch logic 830, and a memory interface 828), datapath logic (such as instruction pipeline(s) 827), and local buffering (such as local buffer 835 and an optional L1 cache 829). For example, the instruction control logic 821 can be used to sequence instructions and route information (e.g., data and/or instructions) between local buffering and other components of the processor core 820. The next-block predictor 822 can be used for storing a history of control decisions and for predicting a future control decision of the program. Specifically, the next-block predictor 822 can identify predicted instruction blocks for execution by the block-based processor core 820. The prefetch logic 830 can be used for managing the local buffer 835 so that the predicted instruction blocks are stored in the local buffer in response to the predicted instruction blocks being identified. The instruction pipeline(s) 827 can be used for executing instructions of the program and may include fetch, decode, execution, read/write, load/store, and commit/abort pipeline stages, for example. The memory interface 828 can be used for receiving memory requests from different components of the processor core 820, issuing memory requests to the memory hierarchy, matching responses to the memory requests, and routing the response data to the components of the processor core 820. The optional L1 cache 829 can be used for temporarily storing data and/or instructions of the program.

The next-block predictor 822 can generate a predicted target instruction block for a given instruction block. For example, the next-block predictor 822 can generate a predicted next instruction block from a currently executing instruction block. The predicted next instruction block can be used an input for the next-block predictor 822 so that a follow-on instruction block can be predicted. In this manner, multiple instruction blocks can be predicted along a predicted path of execution while a currently executing instruction block continues to execute. In other words, the next-block predictor 822 can potentially predict an execution path a few instruction blocks ahead before the currently executing instruction block can make a control decision to transfer control to the next instruction block.

The next-block predictor 822 can store a history of changes in control of the program and predict a future change in control of the program. In particular, the next-block predictor 822 can be used to predict a future control decision and a target associated with the control decision. For example, the next-block predictor 822 can maintain a data structure used for associating an instruction block with a branch likelihood and/or a predicted branch target address. The next-block predictor 822 may differ from branch prediction logic for a conventional RISC processor. Branch prediction logic for a conventional RISC processor may operate on a branch instruction and can predict whether a branch is taken and what the branch target is. The branch instructions can separate basic blocks of a program and can cause a control flow of the program to take the branch or fall-through to the next instruction. Thus, for a given branch instruction, the branch prediction logic for a conventional RISC processor may choose a likely branch target out of two possible choices. In contrast, an instruction block may include multiple basic blocks and may have more than two branch targets. The next-block predictor 822 can be used to predict from among more than two possible target locations. A respective target location is the beginning of an instruction block.

As one example, the next-block predictor 822 can store a prediction table indexed by references to instruction blocks. For example, the reference can be the starting address of the instruction block. A history of target addresses can be maintained for each instruction block so that a future control decision can be predicted based on the history of past control decisions of the instruction block. In other words, the prediction table can be updated each time that a control decision is made for a given instruction block. As a specific example, an instruction block may have eight possible target addresses, numbered 0-7 and the prediction table can track the last four control decisions. If the instruction block were to take the target address 1, 1, 1, 1 during the last four iterations of the instruction block, the predicted target address can be the target address 1, under the assumption that the pattern will repeat. As another example, if the instruction block were to take the target address 3, 5, 3, 5 during the last four iterations of the instruction block, the predicted target address can be the target address 3. As another example, if the instruction block were to take the target address 3, 3, 3, 6 during the last four iterations of the instruction block, the predicted target address can be either the target address 3 (since it is more common based on the past decisions) or the target address 6 (since it matches the most recent decision). It should be noted that four history entries are selected for illustrative purposes, and more or fewer history entries can be used for the prediction table. As another example, the possible target addresses can be weighted, such as by using a saturating counter for each of the target addresses. A two-bit saturating counter can include four states, such as a strongly not taken state, a weakly not taken state, a weakly taken state, and a strongly taken state. Each time a given target address is selected, its corresponding state can be adjusted to a more taken state until it saturates at strongly taken; each time a given target address is not selected, its corresponding state can be adjusted to a less taken state until it saturates at strongly not taken. Thus, the saturating counter can provide a degree of confidence associated with a given target address. The confidence levels can be used to determine how far ahead a prediction can be. For example, more instruction blocks can be selected along higher confidence prediction paths and fewer instruction blocks can be selected along lower confidence prediction paths. The prediction table of the next-block predictor 822 can have fewer entries than a number of instruction blocks of a program. In one example, the prediction table can track an age of the entries so that the more recently used entries are kept and the less recently used entries are replaced. Thus, the prediction table can have prediction information for the more recently used instruction blocks of the program.

The instruction control logic 821 and/or the instruction pipelines 827 can communicate control decisions and target addresses to the prediction table so that the prediction table can be updated when a control decision is made. The instruction control logic 821 can indicate when an instruction block begins and provide a reference to the instruction block so that a prediction can be generated by the next-block predictor 822. The next-block predictor 822 can identify a predicted instruction block along a path of predicted execution and communicate the predicted instruction block to the prefetch logic 830.

Prefetching a predicted instruction block can include initiating copying of one or more of the lines of the predicted instruction block from a slower level of the memory hierarchy into a faster level of the memory hierarchy before program control passes to the predicted instruction block. As a specific example, a cache line including a portion of the predicted instruction block can be copied from the code segment 812 of the memory 810 into the L2 cache 840, the L1 cache 829, and/or the local buffer 835. Prefetching the instruction block can be contrasted with fetching the instruction block. For example, fetching the instruction block can be initiated by the instruction control logic 821 after program control passes to the instruction block and during a fetch stage of the instruction pipeline(s) 827 so that the instruction block is consumed by the instruction pipeline(s) 827. In contrast, prefetching a predicted instruction block is initiated by the prefetch logic 830 before program control passes to the predicted instruction block so that the predicted instruction block can be locally buffered to reduce memory latency if the predicted instruction block is executed.

The prefetch logic 830 can be used for managing the local buffer 835 so that the predicted instruction blocks are at least partially stored in the local buffer 835 in response to the predicted instruction blocks being identified. Specifically, the prefetch logic 830 can be configured to receive a reference to a predicted instruction block, such as from the next-block predictor 822, and to determine a mapping of the predicted instruction block to one or more lines of the local buffer 835. For example, the mapping can be based on a starting address of the predicted instruction block and a size or ending address of the predicted instruction block. The local buffer 835 can be used for storing instruction blocks and providing the instruction blocks to the instruction pipeline 827. The local buffer 835 can include a streaming instruction buffer (SIB) 823 and/or an instruction cache (I$) 825. The lines of the local buffer 835 can be lines within the streaming instruction buffer 823 and/or within the instruction cache 825. A line is a minimum unit of information that can be transferred from within the memory hierarchy to the local buffer 835.

The prefetch logic 830 can include a block fetch queue 831, an occupancy engine 832, and header decode logic 833. For example, the received reference to the predicted instruction block can be the starting address of the predicted instruction block. The starting address of the predicted instruction block can be stored in the block fetch queue 831 while the prefetch logic 830 is processing the predicted instruction block. The processing may take multiple cycles, such as to account for a memory latency of prefetching all or a part of the predicted instruction block. When the processing is complete, the starting address of the predicted instruction block can be removed from the block fetch queue 831. The block fetch queue 831 can store multiple addresses, where each address is associated with a respective predicted instruction block. Additional addresses for predicted instruction blocks can be stored in the block fetch queue 831 when the next-block predictor 822 runs ahead and predicts multiple instruction blocks along the predicted instruction path. If the block fetch queue 831 becomes full, it can provide back-pressure to the next-block predictor 822 so that block prediction can pause while the earlier predicted blocks are prefetched.

The size of the predicted instruction block can be multiple lines long. As one example, the next-block predictor 822 can store sizes of the target instruction blocks, and can provide the size with the reference to the predicted instruction block. As another example, the predicted instruction block can be assumed to be a maximum-sized instruction block, and the number of lines corresponding to the maximum-sized instruction block can be prefetched. As another example, the size of the predicted instruction block can be decoded from the header of the predicted instruction block. Specifically, the prefetch logic 830 can request the line associated with the header be retrieved from memory, such as by issuing a memory request to the memory interface 828 for the line. When the line containing the header is returned, the header decode logic 833 can be used to decode the header and to determine the size of the instruction block. A number of lines of the predicted instruction block can be determined based on an alignment of the predicted instruction block and the size of the predicted instruction block. If the ISA specifies that the instruction blocks are to be aligned on line boundaries then the number of lines of the predicted instruction block is the size of the predicted instruction block divided by the line size. If the predicted instruction block is misaligned with the line boundaries, then an extra line may need to be retrieved.

The lines of the predicted instruction block can be selectively retrieved from the memory so that the predicted instruction block can be stored in the local buffer 835. As one example, all lines of the predicted instruction block can be retrieved by issuing memory requests for the lines to the memory interface 828. For example, the memory requests can be issued after the size of the predicted instruction block is determined. As another example, some or none of the lines of the predicted instruction block can be retrieved from the memory hierarchy. For example, some or all of the lines may already be stored in the local buffer 835 and so only non-locally stored lines are retrieved. The occupancy engine 832 can be used to determine which lines of the predicted instruction block are present in the local buffer 835. For example, each line of the predicted instruction block has an associated address. Each line stored in the local buffer 835 is copied from a memory address, and the most-significant bits of the memory address are stored in tags of the local buffer 835. The occupancy engine 832 can compare the tags of the local buffer 835 to the addresses of the lines of the predicted instruction block to determine if the lines of the predicted instruction block are present in the local buffer 835. The occupancy engine 832 can issue a memory request to the memory interface 828 for each line that is not present in the local buffer 835. By only issuing memory requests for lines not present in the local buffer 835, the memory bandwidth due to prefetching may be reduced which may potentially increase performance of the processor and decrease energy used by the processor. However, the prefetch logic 830 may be more complicated and contention for the tags of the local buffer 835 may be increased. Thus, having an occupancy engine 832 can be a design-time tradeoff.

The lines of the predicted instruction block can be stored in the local buffer 835. In one embodiment, the local buffer 835 can include an instruction cache 825 and a streaming instruction buffer 823. The streaming instruction buffer 823 can include SIB tags and state 824 and a memory 834. The instruction cache 825 can include I$ tags and state 826 and a memory 836. The memories 834 and 836 are organized by lines and can be written one line at a time. The memories 834 and 836 store local, temporary copies of the instruction blocks stored in the memory hierarchy. The tags 824 and 826 store the memory addresses of the lines stored in the memories 834 and 836. The streaming instruction buffer 823 can be sized to account for a latency between the core and a higher level of the memory hierarchy. For example, the streaming instruction buffer 823 can be large enough to supply the instruction pipeline 827 with instructions during a miss in the instruction cache 825 that hits in the L2 cache 840. In particular, it may take 10-20 cycles to retrieve instructions from the L2 cache 840 and the memory 834 can be large enough to hold 10-20 cycles worth of instructions for the instruction pipeline 827. Thus, the streaming instruction buffer 823 can mask the latency between the core 820 and the higher level of the memory hierarchy.

The instruction cache 825 can be used to store lines of instruction blocks that will be or have executed on the processor core 820. Specifically, the lines of the instruction blocks can be copied from the memory hierarchy and stored into the lines of the I$ memory 836. An individual I$ tag is associated with each line of the I$ memory so that the source memory address of the contents of the I$ memory 836 can be identified. The instruction cache 825 is smaller (e.g., it has fewer storage locations) than the memory 810 so that the instruction cache 825 be faster and closer to the components of the processor core 820. The larger address space of the memory 810 can be mapped to the smaller address space of the I$ memory 836 in various ways depending at least on the organization of the instruction cache 825.

For example, the instruction cache 825 can be direct-mapped, fully associative, or n-way set associative, where n is an integer, such as two, four, or eight. In a direct-mapped cache, there is a single mapping of a memory address to a line of the I$ memory 836. For example, the I$ memory line can be the memory address modulo the number of lines in the I$ memory 836. The most-significant bits of the memory addresses can be stored in the I$ tags 826. Thus, the line address in the I$ memory and the I$ tag can be used to identify the memory address. In a fully-associative cache, a memory address can be stored anywhere in the I$ memory 836. The I$ tag associated with the I$ line can store the memory address. In a n-way associative cache, there can be n mappings of a memory address to a line of the I$ memory 836. The lines of the cache can be grouped into sets and a set can be mapped like a direct-mapped cache. Thus, a given memory address can be mapped to two potential lines of the cache when the cache is a 2-way set associative cache. Additional state can be associated with each line. For example, an age of each line of a given set can be maintained, where a most recently used state can indicate the line is the most recently read line of the given set and a least recently used state can indicate the line is the least recently read line of the given set.

The streaming instruction buffer 823 can be used to store lines of instruction blocks that are predicted to be executed on the processor core 820. Specifically, the lines of the instruction blocks can be copied from the memory hierarchy and stored into the lines of the SIB memory 834. An individual SIB tag is associated with each line of the SIB memory so that the source memory address of the contents of the SIB memory 834 can be identified. The SIB tags can be indexed or marked to identify the start of each instruction block stored within the SIB memory 834. The streaming instruction buffer 823 is smaller (e.g., it has fewer storage locations) than the memory 810 so that the streaming instruction buffer 823 be faster and closer to the components of the processor core 820. The larger address space of the memory 810 can be mapped to the smaller address space of the SIB memory 834 in various ways depending at least on the organization of the streaming instruction buffer 823 and whether the occupancy engine 832 is implemented.

As one example, the streaming instruction buffer 823 can be organized as a circular buffer with a first-in first-out access pattern. A circular buffer may potentially be lower power and faster than a comparable sized cache. The streaming instruction buffer 823 can be configured to selectively store lines of a predicted instruction block in the SIB memory 834. For example, all of the lines of the predicted instruction block can be stored in sequential order at a tail of the streaming instruction buffer 823. Additionally or alternatively, the occupancy engine 832 can compare the memory addresses corresponding to each line of the predicted instruction block to the I$ tags 826 and/or the SIB tags 824 to determine if the line of the predicted instruction block is already present in the local buffer 835. If the line is already present, no memory request for the line is issued. If the line is not present, the prefetch logic 830 can issue a request for the line from the memory hierarchy, and the line can be stored at the tail of the streaming instruction buffer 823. Thus, the streaming instruction buffer 823 can be used to directly stream the lines of the predicted instruction blocks to the instruction pipeline(s) 827. Additionally or alternatively, the streaming instruction buffer 823 in combination with the instruction cache 825 can be used to provide the lines of the predicted instruction blocks to the instruction pipeline(s) 827.

For example, when control of the program passes along a predicted execution path to a predicted instruction block stored in the local buffer 835, the local buffer 835 can provide the stored lines of the predicted instruction block to the instruction pipeline(s) 827, such as during a fetch stage of the instruction pipeline(s) 827. If a given line is present in the instruction cache 825, the instruction cache 825 can provide the line. Specifically, the I$ tags 826 can be compared to the address of the requested line, and the requested line can be read from the I$ memory 836 if the line is present in the instruction cache 825. If a given line is present in the streaming instruction buffer 823, the streaming instruction buffer 823 can provide the line. Specifically, the SIB tag corresponding to the head of the streaming instruction buffer 823 can be compared to the address of the requested line, and the requested line can be read from the SIB memory 834 if the line is present in the streaming instruction buffer 823. In one embodiment, the SIB memory 834 can only be read from the head of the streaming instruction buffer 823.

The memory interface 828 can be used for managing the memory bandwidth of the memory hierarchy. For example, the memory interface 828 can receive memory requests from different components of the processor core 820, such as from the prefetch logic 830, the local buffer 835, the instruction pipeline(s) 827, and the L1 cache 829. The memory interface 828 can prioritize memory requests based on a type of memory request and/or a source of the memory request. For example, non-prefetch requests can be prioritized ahead of prefetch requests. As another example, prefetch requests for instruction blocks can be prioritized ahead of prefetch requests for data associated with load and store instructions. The memory interface 828 can issue memory requests to the memory hierarchy and match responses from the memory hierarchy to the memory requests. The response data from the memory hierarchy can be routed to the requesting components of the processor core 820.

FIG. 9 is a flowchart illustrating an example method 900 of prefetching predicted instruction blocks of a program for a block-based processor core. For example, the method 900 can be performed using the processor core 820 when arranged in a system such as the system 800 of FIG. 8. The block-based processor core is used to execute a program using a block-atomic execution model. The program includes one or more instruction blocks where each instruction block can include an instruction block header and a plurality of instructions. Using the block-atomic execution model, the individual instructions of the respective instruction blocks are executed and committed atomically so that final results of the instruction block are architecturally visible to other instruction blocks in a single transaction after a commit.

At process block 910, an address of a predicted instruction block is received. For example, the address can be received from prefetch logic or prediction logic. The address can correspond to a header of the predicted instruction block stored in memory. The address can be a full address pointing to a word or byte location of the memory or the address can be a partial address pointing to a particular line of the memory.

At process block 920, it can be determined whether a copy of information (e.g., the instruction block header) stored at the memory address is stored in an instruction cache. For example, the instruction cache tags can be compared to the received address. If one of the tags matches the received address (an instruction cache hit), the header of the instruction block is present in the instruction cache and the method 900 can continue at process block 950. If none of the tags matches the received address (an instruction cache miss), the header of the instruction block is not present in the instruction cache and the method 900 can continue at process block 930.

At process block 930, it can be determined whether a copy of information stored at the memory address is stored in a streaming instruction buffer. For example, the streaming instruction buffer tags can be compared to the received address. If one of the tags matches the received address (a SIB hit), the header of the instruction block is present in the streaming instruction buffer and the method 900 can continue at process block 932. If none of the tags matches the received address (a SIB miss), the header of the instruction block is not present in the streaming instruction buffer and the method 900 can continue at process block 940.

At process block 932, a valid copy of the instruction block header is already stored within the streaming instruction buffer, and the previously stored copy can be copied to a tail of the streaming instruction buffer. Thus, there can be multiple copies of the same line of the predicted instruction block within the streaming instruction buffer. For example, multiple copies of the same line can occur when the predicted instruction block was predicted earlier and the instruction block has not been overwritten within the streaming instruction buffer yet. As one example, the instruction block can be queued and waiting to be read from the streaming instruction buffer. As another example, the instruction block could have been read during an earlier prediction, been bypassed as being on a mispredicted path, but not yet be overwritten. A treatment of lines stored in the streaming instruction buffer on a mispredicted path is described in further detail below with reference to process block 1160 of FIG. 11. The SIB entry used for storing the header can be marked with a status bit indicating that SIB entry is an instruction header.

At process block 940, a valid copy of the instruction block header is not already stored within the instruction cache or the streaming instruction buffer. The instruction block header can be loaded at the tail of the streaming instruction buffer by retrieving the instruction block header from the memory hierarchy. For example, the streaming instruction buffer can issue a request to the memory interface, the memory interface can receive the instruction block header and write it to the tail of the streaming instruction buffer. The tail is updated with each write of information to the tail. The SIB entry used for storing the header can be marked with a status bit indicating that SIB entry is an instruction header.

At process block 950, a size of the instruction block can be determined. For example, the instruction blocks of a program may be variable sized where a first block has a different size than the second block. The allowable sizes of the instruction block can be specified by the ISA. In one example, instruction blocks can include a fixed-size header and a range of four to 128 instructions, aligned on four-word boundaries. The size of the instruction block and/or the instruction header can be encoded in the instruction header. Thus, the size of the instruction block can be determined by decoding the instruction header, such as the header retrieved in process blocks 932 or 940. Alternatively, the next-block predictor can save the size of the predicted instruction block in its prediction table, and the next-block predictor can provide the prefetch logic with the size. Thus, the time to fetch and decoded the instruction header can be saved.

At process block 960, the remaining lines of the instruction block can be stored at the tail of the streaming instruction buffer. Given the address of the instruction block (e.g., the starting address of the instruction header), the size of the instruction header, and the number of instructions, the range of addresses corresponding to the instruction block can be determined. The area of memory can be divided into lines and a memory request for the remaining lines of the instruction block can be initiated. The memory request can be based on a full prefetching model where all of the lines of the instruction block are requested, or the memory request can be based on a partial prefetching model where only the unbuffered lines of the instruction block are requested. In the full model, all of the lines of instruction block are requested and they can be loaded into the tail of the streaming instruction buffer. In the partial model, only the lines of instruction block that are not present in the local buffer are requested from the memory. The partial model is further described below, with reference to FIG. 10.

FIG. 10 is a flowchart illustrating an example method 1000 of prefetching lines of an instruction block using the partial prefetching model. At process block 1010, an address of a line of an instruction block is received. The address of the line can be compared to the tags of the local buffer to determine if the line is already stored locally. At process block 1020, it is determined if the line is stored in the instruction cache. For example, the address of the line can be compared to the instruction cache tags. If there is a cache hit, the line is not requested from memory and the method 1000 continues at process block 1050. At process block 1030, it is determined if the line is stored in the streaming instruction buffer. For example, the address of the line can be compared to the streaming instruction buffer tags. If there is a hit in the streaming instruction buffer, the line can be copied into the tail of the streaming instruction buffer at process block 1032. Thus, multiple copies of the line may be present in the streaming instruction buffer at different respective lines of the streaming instruction buffer. For example, this can be representative of a predicted loop of the program. If there is not a hit in the instruction cache or the streaming instruction buffer, the line is not currently stored locally. Thus at process block 1040, the line can be retrieved from the memory hierarchy and stored at the tail of the streaming instruction buffer. At process block 1050, it can be determined if there are more lines of the instruction block to retrieve. If there are more lines of the instruction block to potentially retrieve, the method 1000 can continue at process block 1010. Thus, it can be determined if all of the lines of the instruction block are stored locally, either in the streaming instruction buffer or in the instruction cache. When all of the lines of the instruction block have been stored locally, the method 1000 can end.

FIG. 11 is a flowchart illustrating an example method 1100 of reading prefetched instruction blocks of a program. For example, the method 1100 can be performed using the processor core 820 when arranged in a system such as the system 800 of FIG. 8. As described below, the individual lines of the prefetched instruction blocks can be read from either an instruction cache or a streaming instruction buffer of a local buffer of the processor core.

At process block 1110, a request to read a line of an instruction block can be received. For example, the request can come from a fetch stage of an instruction pipeline of the processor core. The request can include an address of the line of the instruction block, and optionally, an indication of whether the line is expected to be an instruction header. The address of the requested line can be compared to one or more tags of the local buffer to determine if the requested line is present in the local buffer.

At process block 1120, it can be determined if the requested line is present in the instruction cache. For example, all or a portion of the address of the requested line can be compared to the instruction cache tags. If the requested line is present (a cache hit), the method 1100 can continue at process block 1130. If the requested line is not present (a cache miss), the method 1100 can continue at process block 1140.

At process block 1130, the requested line is present in the instruction cache and it can be determined if the requested line is also present in the streaming instruction buffer. For example, the line can be present in both the streaming instruction buffer and the instruction cache when the full prefetching model is used to prefetch the instruction blocks. Specifically, it can be determined if the requested line is at the head of the streaming instruction buffer. By only comparing to the head, the streaming instruction buffer can potentially be smaller, faster, and more energy efficient compared to comparing the requested line to all of the entries of the streaming instruction buffer. For example, a datapath of the streaming instruction buffer can be optimized for reading only from the head and tag comparison logic can be reduced since only the tag corresponding to the head is compared.

If the requested line is present in the streaming instruction buffer, at process block 1132, the head of the streaming instruction buffer can be updated. For example, the address of the head can be incremented modulo the number of lines of the streaming instruction buffer. Thus, the head of the streaming instruction buffer will be the next line of the instruction block after the head is updated. At process block 1134, the requested line can be provided. The requested line can be provided by either or both of the streaming instruction buffer and the instruction cache depending on where the requested line was present.

At process block 1140, the requested line is not present in the instruction cache and it can be determined if the requested line is present in the streaming instruction buffer. Specifically, it can be determined if the requested line is at the head of the streaming instruction buffer. If the requested line is present in the streaming instruction buffer, at process block 1142, the head of the streaming instruction buffer can be updated and the requested line can be provided from the streaming instruction buffer. For example, the requested line can be provided to the instruction pipeline and the instruction cache. For example, when the instruction cache is an associative cache, the requested line can replace the information in the least recently used entry corresponding to the memory address.

At process block 1150, the requested line is not present in the local buffer comprising the streaming instruction buffer and the instruction cache. It can be determined if the requested line is an instruction header. For example, the request for the line of the instruction block can include an indication that the line includes a header of the instruction block. Each of the lines or entries of the streaming instruction buffer can include state indicating whether the entry holds a header of an instruction block. If the requested line is not an instruction header, the streaming instruction buffer state can be maintained without any changes being made. However, if the requested line is an instruction header and the line is not in the local buffer, then the predicted path of execution may have been mispredicted. For example, if the path of execution were correctly predicted, the header of the instruction block could have been prefetched and stored in the local buffer. Thus, if the header of the instruction block is not in the local buffer, the method 1100 can continue at process block 1160.

At process block 1160, the predicted instruction path is likely mispredicted because the next instruction block is not present in the local buffer. When the predicted execution path is mispredicted, any valid entries of the streaming instruction buffer are marked as mispredicted. The valid entries of the streaming instruction buffer include the entries between and including the head and tail of the streaming instruction buffer. The valid entries can include the instruction blocks (or portions thereof) that have been prefetched along the predicted path of execution. Thus, the valid entries may no longer be used when the execution path was mispredicted. However, a new predicted execution path may intersect with the earlier mispredicted execution path and the earlier prefetched lines may be reused if the lines have not been overwritten yet. Thus, the mispredicted lines can be marked as mispredicted and valid, so that the lines can potentially be copied to the tail of the streaming instruction buffer if the lines are requested later (such as at process blocks 932 and 1032 of FIGS. 9 and 10, respectively).

When the predicted instruction path is mispredicted, the head of the streaming instruction buffer can be updated. For example, the streaming instruction buffer can be marked as empty indicating that no lines known along the predicted execution path have been prefetched. The head and the tail of the streaming instruction buffer can both be moved to the entry following the mispredicted tail so that lines along the mispredicted path may remain in the streaming instruction buffer while lines along the new predicted path are stored.

When the predicted instruction path is mispredicted, any pending memory requests from the prefetch logic can be flushed or aborted. By aborting memory requests for lines along the mispredicted instruction path, the memory bandwidth may be more efficiently utilized. For example, memory requests for lines along the new predicted instruction path may be serviced earlier than if the pending memory requests are not aborted.

At process block 1170, a hit or a miss can be indicated by the local buffer. As one example, separate instruction cache and streaming instruction buffer hit signals can be provided. By providing separate hit signals, the instruction pipeline can route the appropriate information (e.g., the requested line) from either the instruction cache or the streaming instruction buffer to consuming logic in the instruction pipeline. Alternatively, a single hit signal can be provided by the local buffer and the local buffer can route the appropriate information from the local buffer. A miss signal can be provided by the local buffer so that a memory request for the line can be generated by the memory interface. The memory interface can provide the requested line when the request misses the local buffer. The instruction cache of the local buffer may be updated when the requested line is retrieved from the memory hierarchy. For example, when the instruction cache is an associative cache, the requested line can replace the information in the least recently used entry corresponding to the memory address.

FIG. 12 illustrates an example system 1200 comprising a processor 1205 having multiple block-based processor cores 1220A-C (collectively 1220) and a memory hierarchy. The block-based processor cores 1220 can be physical processor cores and/or logical processor cores comprising multiple physical processor cores. The memory hierarchy can be arranged in various different ways. For example, different arrangements may include more or fewer levels within the hierarchy, and different components of the memory hierarchy can be shared among different components of the system 1200. The components of the memory hierarchy can be integrated on a single integrated circuit or chip. Alternatively, one or more of the components of the memory hierarchy can be external to a chip including the processor 1205. As illustrated, the memory hierarchy can include storage 1290, memory 1210, and an L2 cache (L2$) 1240 that is shared among the block-based processor cores 1220. The memory hierarchy can include multiple local instruction buffers (I-buffers) 1221A-C (collectively 1221) and/or L1 caches 1224A-C (collectively 1224) that are private within a respective core of the processor cores 1220. In one example, the processor cores 1220 may address virtual memory and there is a translation between virtual memory addresses and the physical memory addresses. For example, a memory management unit (MMU) 1252 can be used for managing and allocating virtual memory so that the addressable memory space can exceed the size of the main memory 1210. The virtual memory can be divided into pages and the active pages can be stored in the memory 1210 and inactive pages can be stored on backing store within the storage device 1290. The memory controller 1250 can communicate with the input/output (I/O) interface 1260 to move pages between main memory and the backing store.

Information, such as data and instructions, can be accessed at different granularities at different levels of the memory hierarchy. For example, an instruction may access memory in units of a byte, a half-word, a word, or a double-word. The unit of transfer between the memory 1210 and the L2 cache 1240 and between the L2 cache 1240 and the L1 caches 1224 and/or local buffers 1221 can be a line. A cache line can be multiple words wide, and the cache line size may differ between different levels of the memory hierarchy. The unit of transfer between the storage device 1290 and the memory 1210 can be a page or a block. A page can be multiple cache lines wide. Thus, loading or prefetching data and/or instructions may cause a larger unit of data to be copied from one level of the memory hierarchy to another level of the memory hierarchy. As a specific example, a load instruction executing on processor core 1220A and requesting a half-word of data that is located in a paged-out block of memory can cause a block of memory to be copied from the storage device 1290 to the main memory 1210, a first line to be copied from the main memory 1210 to the L2 cache 1240, a second line to be copied from the L2 cache 1240 to the L1 cache 1224A, and a word or half-word to be copied from the L1 cache 1224A to an operand buffer of the processor core 1220A. The requested half-word of data is contained within each of the first line, the second line, and the block.

When multiple processor cores can have different copies of a particular memory location at the L1 or local level, the potential exists for local copies to have different values for the same memory location. The L1-level can include the L1-caches 1224 (storing data and/or instructions) and the local instruction buffers 1221 which can include respective instruction caches 1225A-C and streaming instruction buffers 1226A-C. A directory 1230 and a cache coherence protocol can be used to keep different copies of the memory consistent. In some examples, the directory 1230 is implemented at least in part using one or more of: hardwired finite state machines, programmable microcode, programmable gate arrays, programmable processors, or other suitable control circuits. The directory 1230 can be used to maintain residency information 1236 including presence information about where copies of memory lines are located. For example, the memory lines can be located in the caches of the processor 1205 and/or in caches of other processors that share the memory 1210. Specifically, the residency information 1236 can include presence information at the L1 granularity of the processor cores 1220. In order to maintain consistent copies of the memory locations, the cache coherence protocol can require that only one processor core 1220A-C can write to a particular memory location at a given time. Various different cache protocols can be used, such as the MESI protocol as described in this example. In order to write to the memory location, the processor core can obtain an exclusive copy of the memory location and record the coherence state as "E" in the coherence states 1232. The memory locations can be tracked at the granularity of the local buffer or L1 cache line size. The tags 1234 can be used to maintain a list of all memory locations that are present in the L1 caches and local buffers. Thus, each memory location has a corresponding entry in the tags 1234, the residency information 1236, and the coherence states 1232. When a processor core writes to the memory location, such as by using a store instruction, the coherence state can be changed to the modified or "M" state. Multiple processor cores can read an unmodified version of the same memory location, such as when the processor cores prefetch or load the memory location using a load instruction or when instruction blocks are prefetched using the prefetch logic 1222A-C. When multiple copies of the memory location are stored in multiple L1 caches, the coherence state can be the shared or "S" state. However, if one of the shared copies is to be written to by a first processor, the first processor obtains an exclusive copy by invalidating the other copies of the memory location. The other copies are invalidated by having the coherence state of the other copies changed to the invalid or "I" state. Once the copy of the memory location is modified, the updated memory location can be shared by writing back the modified value to the memory and invalidating or changing the coherence state to shared for the cached copy of the memory location that was modified.

The block-based processor cores 1220 can execute different programs and/or threads that share the memory 1210. A thread is a unit of control within a program where instruction blocks are ordered according to a control flow of the thread. The thread can include one or more instruction blocks of the program. The thread may include a thread identifier to distinguish it from other threads, a program counter referencing a non-speculative instruction block of the thread, a logical register file for passing values between instruction blocks of the thread, and a stack for storing data, such as activation records, local to the thread. A program can be multi-threaded, where each thread can operate independently of the other threads. Thus, different threads can execute on different respective processor cores. The different programs and/or threads executing on the processor cores 1220 can share the memory 1210 according to a cache coherency protocol, as described above.

FIGS. 13A and 13B illustrate example block-based processor cores 1330 and 1370 for executing a program comprising instruction blocks. Specifically, FIGS. 13A and 13B illustrate alternative embodiments of local instruction buffers for storing prefetched instruction blocks. In some examples, the individual components of the processor cores 1330 and 1370 are implemented at least in part using one or more of: hardwired finite state machines, programmable microcode, programmable gate arrays, and/or other suitable control circuits.

In FIG. 13A, the block-based processor core 1320 includes a local instruction buffer 1330 comprising a streaming instruction buffer 1331 and no L1 cache or instruction cache. Thus, all prefetched instruction blocks are stored in the streaming instruction buffer 1331. The instruction blocks to prefetch are generated by prediction logic 1322, such as when an instruction block is executing in the instruction pipeline(s) 1327. For example, the prediction logic 1322 can use a table-based algorithm for predicting the next instruction block to execute based at least on a predecessor instruction block. A history of next-instruction blocks can be tabulated for a set of instruction blocks recently executed by the processor core 1320. After the prediction logic 1322 selects a predicted instruction block, the prefetch logic 1323 can issue one or more requests to the memory interface 1328 to prefetch the predicted instruction block from the memory hierarchy. The prefetched instruction block can be pushed or stored at a tail of the streaming instruction buffer 1331. For example, individual lines of the prefetched instruction block can be stored at different sequential locations of the memory 1333 and the addresses of the individual lines can be stored in the corresponding tags 1332. Since there is no instruction cache, all of the lines of the predicted instruction block are sequentially stored in the streaming instruction buffer 1331. When the execution path is correctly predicted, the prefetched instruction blocks can be pulled or read from a head of the streaming instruction buffer 1331, such as during a fetch stage of the instruction pipeline(s) 1327. However, when the execution path is incorrectly predicted, the prefetched instruction blocks in the streaming instruction buffer can be either invalidated or marked as mispredicted.

In FIG. 13B, the block-based processor core 1370 includes a local instruction buffer 1380 comprising an associative instruction cache 1381 and no L1 cache or streaming instruction buffer. Thus, all prefetched instruction blocks are stored in the associative instruction cache 1381. The instruction blocks to prefetch are generated by prediction logic 1322, such as when an instruction block is executing in the instruction pipeline(s) 1327. For example, the prediction logic 1322 can use a table-based algorithm for predicting the next instruction block to execute based at least on a predecessor instruction block. A history of next-instruction blocks can be tabulated for a set of instruction blocks recently executed by the processor core 1370. After the prediction logic 1322 selects a predicted instruction block, the prefetch logic 1373 can potentially issue one or more requests to the memory interface 1328 to prefetch the predicted instruction block from the memory hierarchy. The prefetch logic 1373 can compare the tags 1382 to the addresses of the lines of the predicted instruction block to determine if any of the lines are present in the associative instruction cache 1381. For each line that is not present in the associative instruction cache 1381, the prefetch logic 1373 can issue a request to the memory interface 1328 to prefetch the line from the memory hierarchy.

The returning prefetched lines can be stored in the memory 1383 of the associative instruction cache 1381. However, the state 1382 associated with the lines of the memory 1383 can be different for prefetch requests (caused by prefetch misses) as compared to demand requests (caused by demand misses). For example, a demand miss is when the instruction pipeline(s) 1327 misses in the associative instruction cache 1381. The demand miss causes a line within a given set of the memory 1383 to be filled. Under a least recently used (LRU) policy, the least recently used line of the given set is evicted (e.g., copied over) and replaced by the new requested line. Because the line is being used by the instruction pipeline(s) 1327, the state of the new line is set to most recently used, and the line formerly having the state of most recently used is downgraded to least recently used (in a 2-way set associative cache) or one level less than most recently used (in a set associative cache with more than two sets). The state of the line can be stored with the tag of the line in the tags and state 1382 of the associative instruction cache 1381. In contrast, a prefetch miss is caused when the prefetch logic 1373 misses in the associative instruction cache 1381. The prefetch miss also causes a line within a given set of the memory 1383 to be filled. As with the demand miss, the least recently used line of the given set is evicted (e.g., copied over) and replaced by the new requested line. However, the state of the new line is set to least recently used instead of most recently used. Predicted prefetched lines are speculative and so they may not get executed, such as when the execution path is mispredicted. Because an incoming line evicts a previously stored line, the associative instruction cache 1381 may get polluted with speculative lines that will not executed. In other words, useful lines that may get reused can potentially be replaced with speculative lines that do not get used. In order to reduce the impact of potential cache pollution, the speculative lines can replace the lines that are less likely to be reused, which is the lines having the least recently used state.

When the execution path is correctly predicted, the prefetched instruction blocks can be read from the associative instruction cache 1381, such as during a fetch stage of the instruction pipeline(s) 1327. When the instruction pipeline(s) 1327 reads the prefetched lines, the state of the lines is upgraded to most recently used. On the other hand, if the execution path is incorrectly predicted, the prefetched instruction blocks remain in the associative instruction cache 1381 until they are evicted by a demand request or a different prefetch request. Since the mispredicted prefetched lines are stored as the least recently used state, the mispredicted lines will be the first line of a set to be evicted. Thus, any impact of polluting the cache with speculative lines may be reduced.

X. Example Methods of Prefetching Instruction Blocks

Figure 14:
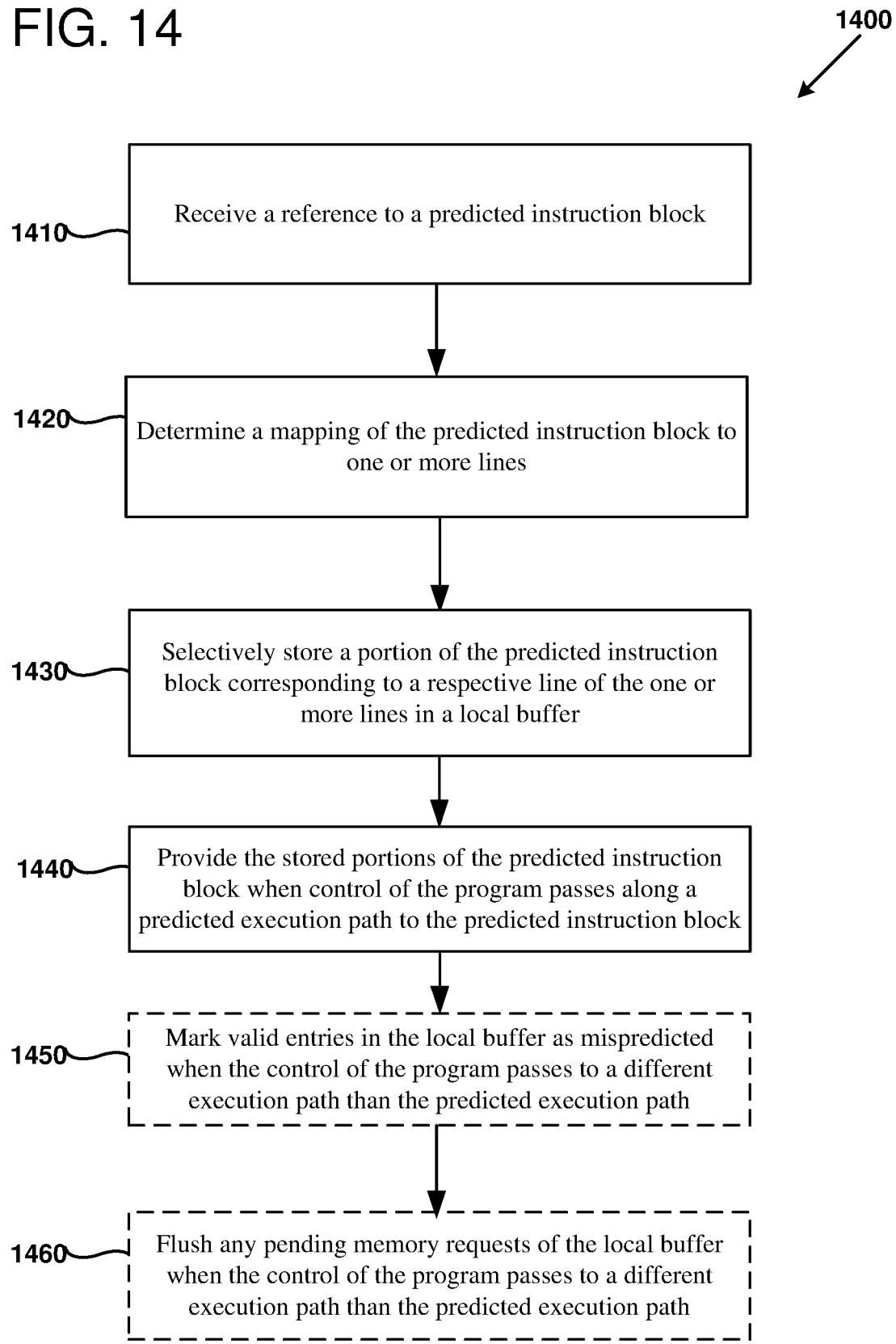
FIGS. 14-15 are flowcharts illustrating example methods of executing an instruction block on a block-based processor core, as can be performed in some examples of the disclosed technology.

FIG. 14 is a flowchart illustrating an example method 1400 of executing an instruction block on a block-based processor core. For example, the method 1400 can be performed using the block-based processor cores 805, 1320, and 1370 of FIGS. 8, 13A, and 13B, respectively. The block-based processor core is used to execute a program using a block-atomic execution model. The program includes one or more instruction blocks where each instruction block can include an instruction block header and a plurality of instructions. Using the block-atomic execution model, the individual instructions of the respective instruction blocks are executed and committed atomically so that final results of the instruction block are architecturally visible to other instruction blocks in a single transaction after a commit.

At process block 1410, a reference to a predicted instruction block can be received. For example, the reference to the predicted instruction block can be provided by prediction logic that predicts an instruction block based on a history of executed instruction blocks. The reference can be an address associated with the predicted instruction block, such as a starting address of an instruction header of the predicted instruction block. Additional information may be received with the reference, such as a size of predicted instruction block.

At process block 1420, a mapping of the predicted instruction block to one or more lines can be determined. A line is a minimum unit of information that can be transferred from within a memory hierarchy to a local buffer of the processor core. The local buffer can include either or both of a streaming instruction buffer and an instruction cache. The predicted instruction block can be multiple lines long and the size of the instruction block can be encoded in an instruction header of the instruction block. The mapping can include retrieving and/or decoding the instruction header to determine the size of the predicted instruction block. Alternatively, the size and/or ending address of the instruction block can be retrieved from a table that is separate from the instruction block. The mapping can include determining all of the lines within the memory hierarchy where the predicted instruction block is stored. The mapping can include determining which lines within the local buffer can be used to the store predicted instruction block.

At process block 1430, a portion of the predicted instruction block can be selectively stored in a line of the local buffer. The portion of the predicted instruction block can be a line of the predicted instruction block. The individual portions of the predicted instruction block can be selected based on an occupancy of the portions within an instruction cache of the processor core. For example, the selected portions can be the portions not present in the instruction cache. The selected portions can be stored in an instruction cache of the local buffer or in a streaming instruction buffer of the local buffer. As one example, a given selected portion can be stored at the tail of the streaming instruction buffer. As another example, a given selected portion can be stored at the mapped set and line of the associative instruction cache. Specifically, the selected portion can replace the least recently used line of the set. Additional information associated with the predicted instruction block can be stored as state within the local buffer. For example, an index of starting locations of each instruction block stored within the local buffer can be maintained so that all of the instruction blocks stored within the local buffer can be identified by searching the index.

At process block 1440, the stored portion of the predicted instruction block can be provided when control of the program passes along a predicted execution path to the predicted instruction block. For example, the stored portion can be provided in response to a request from an instruction pipeline of the processor core. As a specific example, the stored portion can be read from the head of the streaming instruction buffer of the local buffer. As another example, the stored portion can be identified from the index of starting locations of each instruction block so that instruction blocks within the predicted execution path can be skipped over. The stored portion can be read from a read port of the instruction cache of the local buffer. By providing the stored portion from the local buffer, the execution speed of the program may be increased as compared to not prefetching the stored portion from the memory hierarchy.

At optional process block 1450, valid entries in the local buffer can be marked as mispredicted when the control of the program passes to a different execution path than the predicted execution path. If the mispredicted path diverges from the new predicted path (e.g., there are no shared instruction blocks between the paths), the marked entries may be overwritten with instruction blocks along the new predicted execution path. However, the marked entries may be reused if the entries are not yet overwritten before a given marked entry intersects with the new predicted execution path. By reusing the marked entry, memory bandwidth to the memory hierarchy may be conserved.

At optional process block 1460, any pending memory requests of the local buffer can be flushed when the control of the program passes to a different execution path than the predicted execution path. Because the execution path has changed, any pending memory requests may be for instruction blocks that will not be used. By flushing the pending memory requests, local buffer space and memory bandwidth to the memory hierarchy may be conserved.

Figure 15:
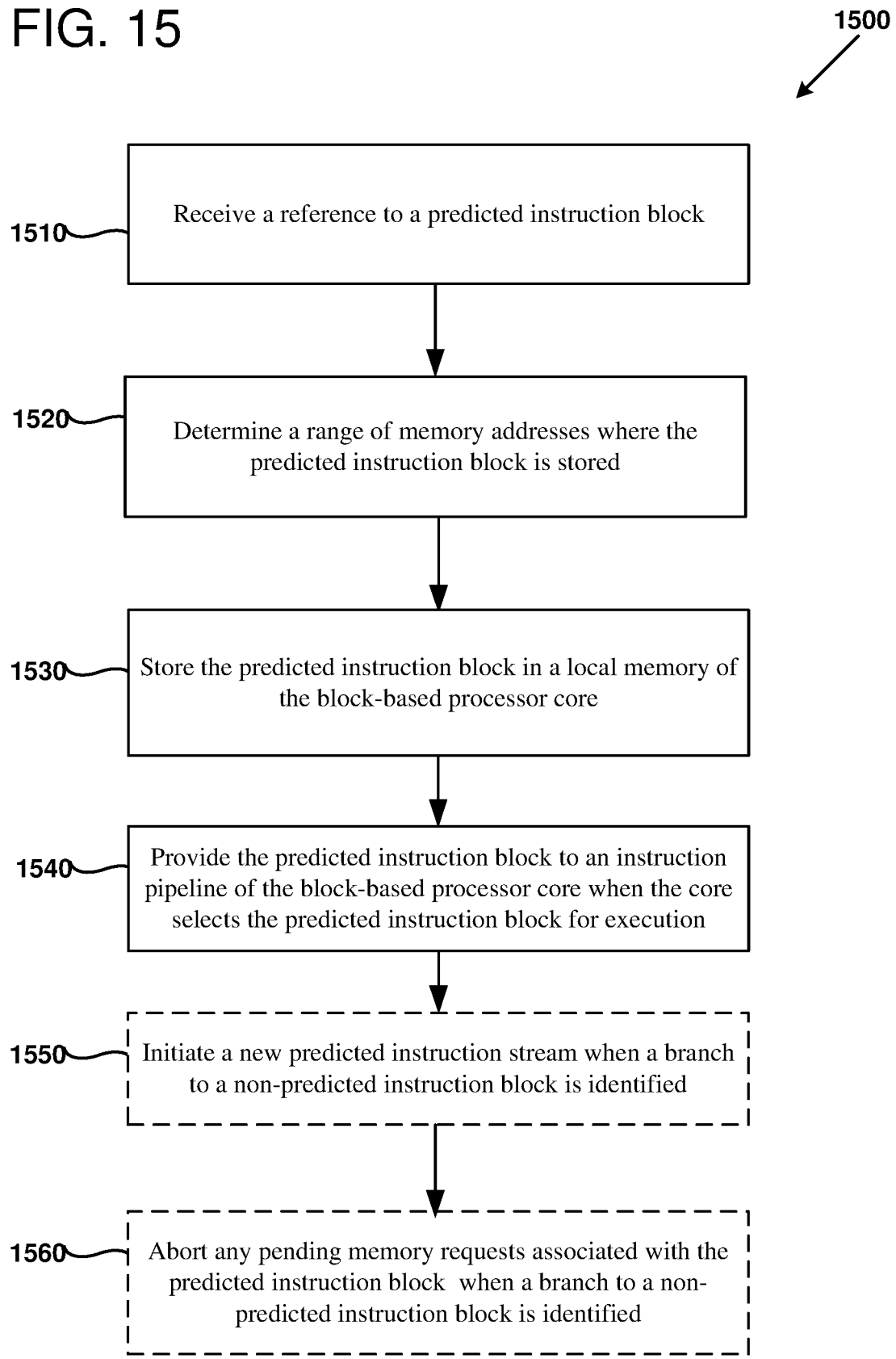

FIG. 15 is a flowchart illustrating an example method 1500 of executing an instruction block on a block-based processor core. For example, the method 1500 can be performed using the block-based processor cores 805, 1320, and 1370 of FIGS. 8, 13A, and 13B, respectively.

At process block 1510, a reference to a predicted instruction block can be received. For example, the reference to the predicted instruction block can be provided by prediction logic that predicts an instruction block based on a history of executed instruction blocks. The reference can be an address associated with the predicted instruction block, such as a starting address of an instruction header of the predicted instruction block. The reference to the predicted instruction block can be received during execution of an earlier instruction block in the path of predicted instruction. The predicted instruction block can be multiple instruction blocks later in the path of predicted instruction, so that multiple predicted instruction blocks can be prefetched.

At process block 1520, a range of memory addresses where the predicted instruction block is stored can be determined. For example, the range of memory addresses can be based at least on information in an instruction header of the predicted instruction block. The different instruction blocks of a given program can vary in size. The size of each instruction block can be encoded in the instruction header of each instruction block. The size can be encoded as a number of bytes, words, instructions, lines, quad-words, or other suitable measure. The encoded size can include or exclude the size of the instruction header. By reading the header of the instruction block and decoding the header, the size of the instruction block can be determined. The range of memory addresses of the predicted instruction block can be from a starting address of the instruction block to the starting address of the instruction block plus the size of the instruction block.

At process block 1530, the predicted instruction block can be stored in a local memory of the block-based processor core. For example, the local memory of the block-based processor core can be incorporated into a streaming instruction buffer. As another example, the local memory of the block-based processor core can be incorporated into an associative instruction cache. As another example, the local memory of the block-based processor core can be incorporated into a streaming instruction buffer and an instruction cache. The predicted instruction block can be greater than an individual storage location of the local memory. Thus, an individual portion of the predicted instruction block can be stored at a single address of the local memory and a collection of all of the portions of the predicted instruction block can be stored at multiple different addresses of the local memory. The selected address of the local memory can depend on a history of prefetched and/or executed instruction blocks, the range of memory addresses where the predicted instruction block is stored, and/or an organization used to access the local memory. For example, the predicted instruction block can be stored in sequential locations (modulo a number of entries of the local memory) of the local memory within a streaming instruction buffer. As another example, one or more of the memory addresses of the predicted instruction block can be mapped to an address and/or a set of an instruction cache comprising the local memory.

At process block 1540, the predicted instruction block can be provided to an instruction pipeline of the block-based processor core when the core selects the predicted instruction block for execution. For example, the core can select the predicted instruction block for speculative or non-speculative execution when resources of the core are available. As a specific example, the predicted instruction block can be speculatively executed when an instruction window of the core is available and the target of an earlier instruction block is not yet known. As another specific example, the predicted instruction block can be non-speculatively executed when the branch target of an earlier non-speculative instruction block is known to target the predicted instruction block. As another specific example, the predicted instruction block can be non-speculatively executed when a branch to the predicted instruction block is committed. For example, if the execution path is correctly predicted, the instruction block preceding the predicted instruction block can perform a branch instruction that loads a program counter of the processor core with the address of the predicted instruction block. The program counter is updated when an instruction block is committed. The loaded program counter can initiate a fetch phase of the block-based processor core which can request the predicted instruction block from the local memory. The local memory can provide the predicted instruction block in response to the request.

At optional process block 1550, a new predicted instruction stream can be initiated when a branch to a non-predicted instruction block is identified. For example, the new predicted instruction stream can be initiated after it is determined that a branch to the predicted instruction block will not be taken. As another example, the new predicted instruction stream can be initiated when a branch to a non-predicted instruction block is committed. Initiating a new predicted instruction stream can include marking entries stored in the local memory as mispredicted. Initiating a new predicted instruction stream can include providing an address of a beginning instruction block of the new predicted instruction stream to prediction logic so that a new predicted instruction block can be predicted.

At optional process block 1560, aborting any pending memory requests associated with the predicted instruction block when a branch to a non-predicted instruction block is identified. Because the execution path has changed, any pending memory requests may be for instruction blocks that will not be used. By aborting the pending memory requests, memory bandwidth to the memory hierarchy may be conserved.

XI. Example Computing Environment

Figure 16:
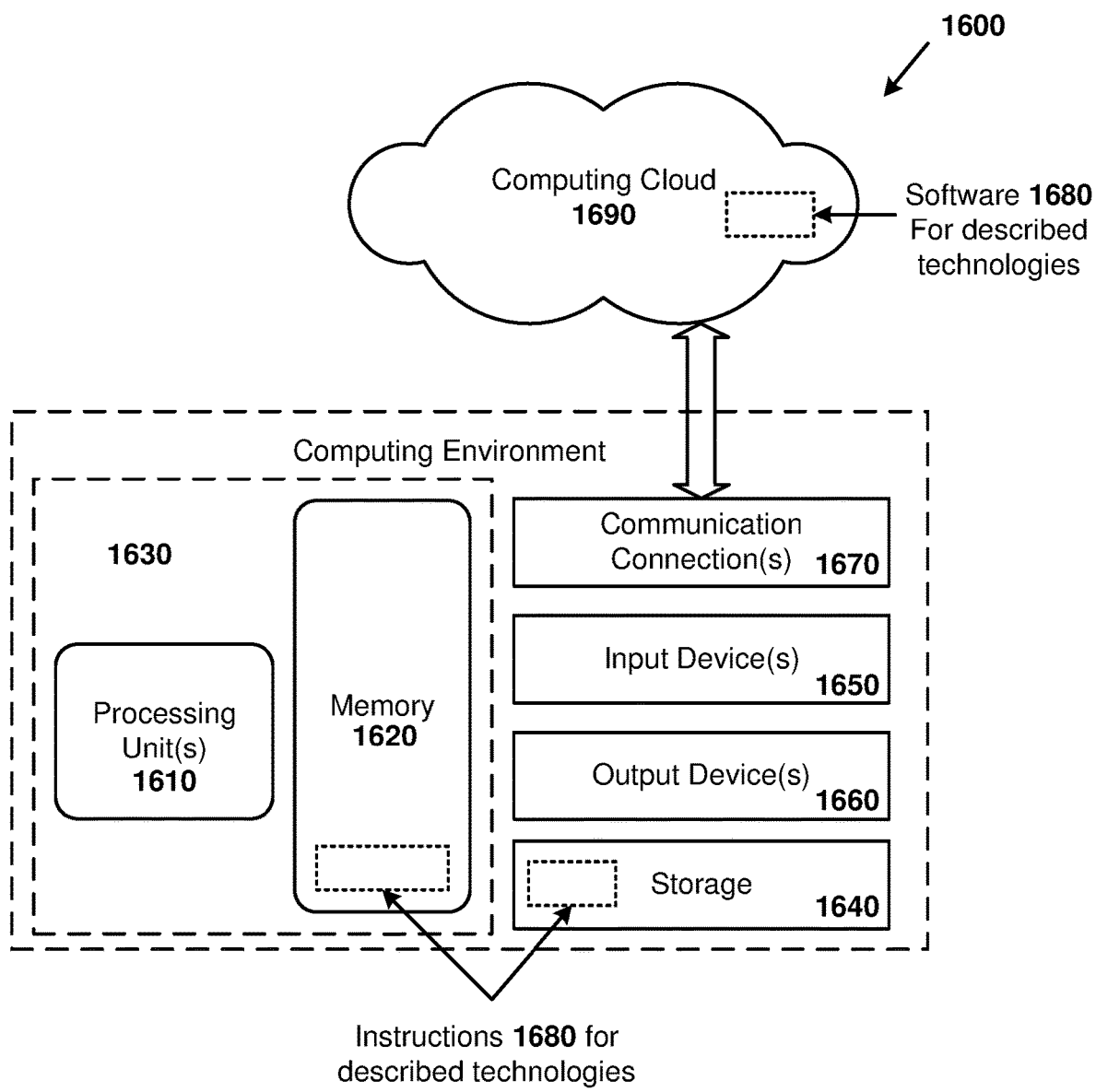
FIG. 16 is a block diagram illustrating a suitable computing environment for implementing some embodiments of the disclosed technology.

FIG. 16 illustrates a generalized example of a suitable computing environment 1600 in which described embodiments, techniques, and technologies, including supporting prefetching of instruction blocks for a block-based processor, can be implemented.

The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 16, the computing environment 1600 includes at least one block-based processing unit 1610 and memory 1620. In FIG. 16, this most basic configuration 1630 is included within a dashed line. The block-based processing unit 1610 executes computer-executable instructions and may be a real or a virtual processor. In a multi-processing system, multiple processing units execute computer-executable instructions to increase processing power and as such, multiple processors can be running simultaneously. The memory 1620 may be volatile memory (e.g., registers, cache, RAM), non-volatile memory (e.g., ROM, EEPROM, flash memory, etc.), or some combination of the two. The memory 1620 stores software 1680, images, and video that can, for example, implement the technologies described herein. A computing environment may have additional features. For example, the computing environment 1600 includes storage 1640, one or more input devices 1650, one or more output devices 1660, and one or more communication connections 1670. An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and that can be accessed within the computing environment 1600. The storage 1640 stores instructions for the software 1680, plugin data, and messages, which can be used to implement technologies described herein.

The input device(s) 1650 may be a touch input device, such as a keyboard, keypad, mouse, touch screen display, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The output device(s) 1660 may be a display, printer, speaker, CD-writer, or another device that provides output from the computing environment 1600.

The communication connection(s) 1670 enable communication over a communication medium (e.g., a connecting network) to another computing entity. The communication medium conveys information such as computer-executable instructions, compressed graphics information, video, or other data in a modulated data signal. The communication connection(s) 1670 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1690. For example, disclosed compilers and/or block-based-processor servers are located in the computing environment 1630, or the disclosed compilers can be executed on servers located in the computing cloud 1690. In some examples, the disclosed compilers execute on traditional central processing units (e.g., RISC or CISC processors).

Computer-readable media are any available media that can be accessed within a computing environment 1600. By way of example, and not limitation, with the computing environment 1600, computer-readable media include memory 1620 and/or storage 1640. As should be readily understood, the term computer-readable storage media includes the media for data storage such as memory 1620 and storage 1640, and not transmission media such as modulated data signals.

XII. Additional Examples of the Disclosed Technology

Additional examples of the disclosed subject matter are discussed herein in accordance with the examples discussed above.

In one embodiment, a processor comprises a block-based processor core for executing a program comprising a plurality of instruction blocks. A respective instruction block comprises a plurality of instructions. The block-based processor core comprises prefetch logic and a streaming instruction buffer. The prefetch logic is in communication with the streaming instruction buffer. The prefetch logic is configured to receive a reference to a predicted instruction block. For example, the reference to the predicted instruction block can be the starting address of the instruction block. The prefetch logic is configured to determine a mapping of the predicted instruction block to one or more lines. The mapping can be based on a starting address of the predicted instruction block and an end of the predicted instruction block. For example, the mapping can be based on a starting address of the predicted instruction block and a size of the predicted instruction block encoded in an instruction header of the predicted instruction block. The prefetch logic can be configured to decode the instruction header of the predicted instruction block to determine the size of the predicted instruction block. The streaming instruction buffer is configured to selectively store portions of the predicted instruction block corresponding to respective lines of the one or more lines. The streaming instruction buffer is configured to provide the stored portions of the predicted instruction block when control of the program passes along a predicted execution path to the predicted instruction block. The streaming instruction buffer can be configured to store all portions of the predicted instruction block in a sequential order in the streaming instruction buffer.

The streaming instruction buffer can be configured to mark valid entries in the streaming instruction buffer as mispredicted entries when the control of the program passes to a different execution path than the predicted execution path. One of the mispredicted entries can be reused within the streaming instruction buffer before the one of the mispredicted entries is overwritten. Any pending memory requests of the streaming instruction buffer can be flushed when the control of the program passes to a different execution path than the predicted execution path. The streaming instruction buffer can be further configured to index each instruction block stored in the streaming instruction buffer.

The block-based processor core may include an instruction cache. The instruction cache can be configured to store cache lines associated with the plurality of instruction blocks. The stored portions of the predicted instruction block stored in the streaming instruction buffer are not stored in the instruction cache. Thus, all portions of the predicted instruction block can be stored locally at the processor core without having the same portion stored multiple times.

The processor can be used in a variety of different computing systems. For example, a server computer can include non-volatile memory and/or storage devices; a network connection; memory storing one or more instruction blocks; and the processor including the block-based processor core for executing the instruction blocks. As another example, a device can include a user-interface component; non-volatile memory and/or storage devices; a cellular and/or network connection; memory storing one or more of the instruction blocks; and the processor including the block-based processor core for executing the instruction blocks. The user-interface component can include at least one or more of the following: a display, a touchscreen display, a haptic input/output device, a motion sensing input device, and/or a voice input device.

In one embodiment, a processor comprises a block-based processor core for executing a plurality of instruction blocks. A respective instruction block comprises a plurality of instructions. The block-based processor core comprises a local buffer, prediction logic, and prefetch logic. The local buffer is used for storing instruction blocks and providing the instruction blocks to an instruction pipeline of the processor core. The prediction logic is configured to identify a predicted instruction block for execution by the block-based processor core. The prefetch logic is configured to determine a mapping of the predicted instruction block to one or more lines of the local buffer based on a starting address of the predicted instruction block and an ending address of the predicted instruction block. The prefetch logic is configured to manage the local buffer so that the predicted instruction block is stored in the local buffer in response to the predicted instruction block being identified.

The local buffer can be configured in various ways. As one example, the local buffer can include an associative instruction cache configured to store the predicted instruction block in the mapped lines of the local buffer. The associative instruction cache can be configured to use a least recently used cache replacement policy, and the predicted instruction block can be stored in the mapped lines of the associative instruction cache with a least recently used status. As another example, the local buffer can include a streaming instruction buffer. The mapped lines of the streaming instruction buffer can be consecutive sequential locations of a circular buffer, and the providing the instruction blocks to the instruction pipeline comprises reading from a head of the circular buffer. As another example, the local buffer can include a streaming instruction buffer and an instruction cache. Respective lines of the predicted instruction block can be mapped to either the streaming instruction buffer or the instruction cache.

In one embodiment, a method can be used to execute a program on a processor comprising a block-based processor core. The method comprises receiving a reference to a predicted instruction block that is predicted to be executed on the block-based processor core. The predicted instruction block comprises an instruction header and a plurality of instructions. The reference to the predicted instruction block can be received during execution of a first instruction block. The method comprises determining a range of memory addresses where the predicted instruction block is stored based at least on information in the instruction header. The method comprises storing the predicted instruction block in a local memory of the block-based processor core. The predicted instruction block can be stored in the local memory during execution of the first instruction block. The method comprises providing the predicted instruction block to an instruction pipeline of the block-based processor core when the core selects the predicted instruction block for speculative or non-speculative execution. The method may include initiating a new predicted instruction stream when a branch to a non-predicted instruction block is identified. The method may include aborting any pending memory requests associated with the predicted instruction block when a branch to a non-predicted instruction block is identified.

The local memory can be located within various structures of the block-based processor core. As one example, the local memory can be incorporated into a streaming instruction buffer. As another example, the local memory can be incorporated into a streaming instruction buffer and an instruction cache. As another example, the local memory can be incorporated into an associative instruction cache. The predicted instruction block can be stored as a least recently used set of the associative instruction cache.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

I claim:

1. A processor comprising a block-based processor core configured to execute a program using a block-atomic execution model, the program comprising a plurality of instruction blocks, a respective instruction block comprising a plurality of instructions that are executed atomically, wherein the block-atomic execution model is an execution model where visible architectural state generated by the respective instruction block appears as a single transaction outside of the block-based processor core, the block-based processor core comprising:
   prefetch logic configured to receive a reference to a predicted instruction block and to determine a mapping of the predicted instruction block to a plurality of lines based on a starting address of the predicted instruction block and an end of the predicted instruction block; and
   a streaming instruction buffer configured to selectively store portions of the predicted instruction block corresponding to respective lines of the plurality of lines and to provide the stored portions of the predicted instruction block when control of the program passes along a predicted execution path to the predicted instruction block, the streaming instruction buffer organized as a circular buffer.

2. The block-based processor core of claim 1, wherein the streaming instruction buffer is configured to store all portions of the predicted instruction block in a sequential order in the streaming instruction buffer.

3. The block-based processor core of claim 1, further comprising:
an instruction cache configured to store cache lines associated with the plurality of instruction blocks, and wherein the stored portions of the predicted instruction block stored in the streaming instruction buffer are not stored in the instruction cache.

4. The block-based processor core of claim 1, wherein the prefetch logic is further configured to decode an instruction header of the predicted instruction block to determine the end of the predicted instruction block.

5. The block-based processor core of claim 1, wherein the streaming instruction buffer is further configured to index each instruction block stored in the streaming instruction buffer.

6. The block-based processor core of claim 1, wherein the streaming instruction buffer is further configured to:
mark valid entries in the streaming instruction buffer as mispredicted entries when the control of the program passes to a different execution path than the predicted execution path; and
reuse one of the mispredicted entries within the streaming instruction buffer before the one of the mispredicted entries is overwritten.

7. The block-based processor core of claim 1, wherein pending memory requests of the streaming instruction buffer are flushed when the control of the program passes to a different execution path than the predicted execution path.

8. A processor comprising a block-based processor core configured to execute a plurality of instruction blocks using a block-atomic execution model, a respective instruction block comprising a plurality of instructions, wherein the block-atomic execution model is an execution model where visible architectural state generated by the respective instruction block appears as a single transaction outside of the block-based processor core, the block-based processor core comprising:
a local buffer for storing instruction blocks and providing the instruction blocks to an instruction pipeline, the local buffer comprising a streaming instruction buffer organized as a circular buffer;
prediction logic configured to identify a predicted instruction block for execution by the block-based processor core; and
prefetch logic configured to:
determine a mapping of the predicted instruction block to a plurality of lines of the local buffer based on a starting address of the predicted instruction block and an ending address of the predicted instruction block, and wherein the predicted instruction block is mapped to consecutive sequential locations of the circular buffer of the streaming instruction buffer; and
manage the local buffer so that the predicted instruction block is stored in the local buffer in response to the predicted instruction block being identified.

9. The block-based processor core of claim 8, wherein the local buffer further comprises an associative instruction cache configured to store at least a portion of the predicted instruction block in the mapped lines of the local buffer.

10. The block-based processor core of claim 9, wherein the associative instruction cache is configured to use a least recently used cache replacement policy, and the at least the portion of the predicted instruction block is stored in the mapped lines of the associative instruction cache with a least recently used status.

11. The block-based processor core of claim 8, wherein the providing the instruction blocks to the instruction pipeline comprises reading from a head of the circular buffer.

12. The block-based processor core of claim 8, wherein the local buffer further comprises an instruction cache, and respective lines of the predicted instruction block are mapped to the streaming instruction buffer or the instruction cache.

13. A method of executing a program on a processor comprising a block-based processor core, the block-based processor core using a block-atomic execution model where visible architectural state generated by a given instruction block appears as a single transaction outside of the executing block-based processor core, the method comprising:
receiving a reference to a predicted instruction block that is predicted to be executed atomically on the block-based processor core, the predicted instruction block comprising an instruction header and a plurality of instructions;
based at least on information in the instruction header, determining a range of memory addresses where the predicted instruction block is stored;
storing at least a first portion of the predicted instruction block in sequential lines of a streaming instruction buffer, organized as a circular buffer, of the block-based processor core; and
providing the predicted instruction block to an instruction pipeline of the block-based processor core when the core selects the predicted instruction block for execution.

14. The method of claim 13, further comprising:
storing a second portion of the predicted instruction block in an instruction cache.

15. The method of claim 13, further comprising:
storing a second portion of the predicted instruction block in an associative instruction cache.

16. The method of claim 15, wherein the second portion of the predicted instruction block is stored as a least recently used set of the associative instruction cache.

17. The method of claim 13, wherein the reference to the predicted instruction block is received during execution of a first instruction block, and the at least the first portion of the predicted instruction block is stored in the streaming instruction buffer during execution of the first instruction block.

18. The method of claim 13, further comprising
initiating a new predicted instruction stream when a branch to a non-predicted instruction block is identified.

* * * * *